(12) United States Patent
Bouchard et al.

(10) Patent No.: US 8,011,990 B2
(45) Date of Patent: *Sep. 6, 2011

(54) PROCESS FOR IMPROVING THE EMISSION OF ELECTRON FIELD EMITTERS

(75) Inventors: Robert Joseph Bouchard, Wilmington, DE (US); Lap-Tak Andrew Cheng, Newark, DE (US); David Herbert Roach, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1031 days.

This patent is subject to a terminal disclaimer.

(21) Appl. No.: 11/239,309

(22) Filed: Sep. 29, 2005

(65) Prior Publication Data

US 2006/0049741 A1    Mar. 9, 2006

Related U.S. Application Data

(63) Continuation of application No. 09/882,719, filed on Jun. 15, 2001, now Pat. No. 7,449,081.

(60) Provisional application No. 60/213,002, filed on Jun. 21, 2000, provisional application No. 60/213,159, filed on Jun. 22, 2000, provisional application No. 60/287,930, filed on May 1, 2001.

(51) Int. Cl.
*B32B 38/10* (2006.01)

(52) U.S. Cl. .......... 445/50; 313/495; 313/497; 156/247; 445/24

(58) Field of Classification Search .......... 313/495–497; 445/24, 50; 156/247
See application file for complete search history.

(56) References Cited

U.S. PATENT DOCUMENTS

| | | | |
|---|---|---|---|
| 4,857,799 A | 8/1989 | Spindt et al. | |
| 5,015,912 A | 5/1991 | Spindt et al. | |
| 5,149,584 A | 9/1992 | Baker et al. | |
| 5,413,866 A | 5/1995 | Baker et al. | |
| 5,458,784 A | 10/1995 | Baker et al. | |
| 5,618,875 A | 4/1997 | Baker et al. | |
| 5,653,951 A | 8/1997 | Baker et al. | |
| 6,057,637 A | 5/2000 | Zettl et al. | |
| 6,097,138 A * | 8/2000 | Nakamoto | 313/309 |
| 6,436,221 B1 * | 8/2002 | Chang et al. | 156/247 |
| 7,137,860 B2 * | 11/2006 | Ahn et al. | 445/50 |
| 7,195,938 B2 * | 3/2007 | Yaniv et al. | 438/20 |
| 7,449,081 B2 * | 11/2008 | Bouchard et al. | 156/247 |
| 7,449,082 B2 * | 11/2008 | Roach | 156/247 |

FOREIGN PATENT DOCUMENTS

JP    04-198271    7/1992
(Continued)

OTHER PUBLICATIONS

L.A. Chernozatonskii et. al., Electron Field Emission From Nanofilament Carbon Films, Chem. Phys. Letters, 1995, p. 233, vol. 63.

(Continued)

*Primary Examiner* — Nimeshkumar Patel
*Assistant Examiner* — Anthony Perry

(57) ABSTRACT

This invention provides a process for improving the field emission of an electron field emitter comprised of an acicular emitting substance such as acicular carbon, an acicular semiconductor, an acicular metal or a mixture thereof, comprising applying a force to the surface of the electron field emitter wherein the force results in the removal of a portion of the electron field emitter thereby forming a new surface of the electron field emitter.

5 Claims, 14 Drawing Sheets

FOREIGN PATENT DOCUMENTS

| WO | WO 94/15350 A1 | 7/1994 |
| WO | WO 94/15352 A1 | 7/1994 |
| WO | WO 94/28571 A1 | 12/1994 |
| WO | WO 9805920 A1 * | 2/1998 |

OTHER PUBLICATIONS

B.H. Fishbine et. al., Buckytube Cold Field Emitter Array Cathode Experiments, Mat. Res. Soc. Symp. Proc., 1995, p. 93-99, vol. 359.

Rinzler et. al., Unraveling Nanotubes: Field Emission From an Atomic Wire, Science, 1995, p. 1550-1553, vol. 269.

W.B. Choi et. al, Fully Sealed, High-Brightness Carbon-Nanotube Field-E Mission Display, Appl. Phys. Lett., 1999, p. 3129-3131, vol. 75.

D.S. Chung et. al., Field Emission From 4.5 in. Single-Walled and Multiwalled Carbon Nanotube Films, J. Vac. Sci. Technol. B vol. 18 (2):1054-1058, 2000.

N.M. Rodriquez et. al., Promotional Effect of Carbon Monoxide on the Decomposition of Ethylene Over an Iron Catalyst, J. Catal., 1993, p. 93-108, vol. 144.

N.M. Rodriquez, A Review of Catalytically Grown Carbon Nanofibers, J. Mater. Res., 1993, p. 3233-3250, vol. 8, No. 12.

Uemura et al., Application of Carbon Nanotubes for Display Devices, Presented at the SID International Symposium, Ise Electronics, Inc., May 17-22, 1998.

* cited by examiner

PROCESS FOR IMPROVING THE EMISSION OF ELECTRON FIELD EMITTERS

CROSS REFERENCE TO RELATED APPLICATIONS

This application is continuation of U.S. application Ser. No. 09/882,719, filed Jun. 15, 2001, now U.S. Pat. No. 7,449,081 which is incorporated in its entirety as a part hereof for all purposes, and which claimed the benefit of U.S. Provisional Appl. No. 60/213,002, filed on Jun. 21, 2000; U.S. Provisional Appl. No. 60/213,159, filed on Jun. 22, 2000; and U.S. Provisional Appl. No. 60/287,930, filed on May 1, 2001.

FIELD OF THE INVENTION

This invention relates to a process for improving the emission of electron field emitters, particularly electron field emitters comprised of acicular carbon.

BACKGROUND OF THE INVENTION

Field emission electron sources, often referred to as field emission materials or field emitters, can be used in a variety of electronic applications, e.g., vacuum electronic devices, flat panel computer and television displays, emission gate amplifiers, and klystrons and in lighting.

Display screens are used in a wide variety of applications such as home and commercial televisions, laptop and desktop computers and indoor and outdoor advertising and information presentations. Flat panel displays can be an inch or less in thickness in contrast to the deep cathode ray tube monitors found on most televisions and desktop computers. Flat panel displays are a necessity for laptop computers, but also provide advantages in weight and size for many of the other applications. Currently laptop computer flat panel displays use liquid crystals, which can be switched from a transparent state to an opaque one by the application of small electrical signals. It is difficult to reliably produce these displays in sizes larger than that suitable for laptop computers.

Plasma displays have been proposed as an alternative to liquid crystal displays. A plasma display uses tiny pixel cells of electrically charged gases to produce an image and requires relatively large electrical power to operate.

Flat panel displays having a cathode using a field emission electron source, i.e., a field emission material or field emitter, and a phosphor capable of emitting light upon bombardment by electrons emitted by the field emitter have been proposed. Such displays have the potential for providing the visual display advantages of the conventional cathode ray tube and the depth, weight and power consumption advantages of the other flat panel displays. U.S. Pat. Nos. 4,857,799 and 5,015,912 disclose matrix-addressed flat panel displays using micro-tip cathodes constructed of tungsten, molybdenum or silicon. WO 94-15352, WO 94-15350 and WO 94-28571 disclose flat panel displays wherein the cathodes have relatively flat emission surfaces.

Field emission has been observed in two kinds of nanotube carbon structures. L. A. Chernozatonskii et al., *Chem. Phys. Letters* 233, 63 (1995) and *Mat. Res. Soc. Symp. Proc.* Vol. 359, 99 (1995) have produced films of nanotube carbon structures on various substrates by the electron evaporation of graphite in $10^{-5}$-$10^{-6}$ torr ($1.3 \times 10^{-3}$-$1.3 \times 10^{-4}$ Pa). These films consist of aligned tube-like carbon molecules standing next to one another. Two types of tube-like molecules are formed; the A-tubelites whose structure includes single-layer graphite-like tubules forming filaments-bundles 10-30 nm in diameter and the B-tubelites, including mostly multilayer graphite-like tubes 10-30 nm in diameter with conoid or dome-like caps. They report considerable field electron emission from the surface of these structures and attribute it to the high concentration of the field at the nanodimensional tips. B. H. Fishbine et al., *Mat. Res. Soc. Symp. Proc.* Vol. 359, 93 (1995) discuss experiments and theory directed towards the development of a buckytube (i.e., a carbon nanotube) cold field emitter array cathode. A. G. Rinzler et al., *Science* 269, 1550 (1995) report the field emission from carbon nanotubes is enhanced when the nanotubes tips are opened by laser evaporation or oxidative etching. W. B. Choi et al., *Appl. Phys. Lett.* 75, 3129 (1999) and D. S. Chung et al., *J. Vac. Sci. Technol.* B 18(2) report the fabrication of a 4.5 inch flat panel field display using single-wall carbon nanotubes-organic binders. The single-wall carbon nanotubes were vertically aligned by paste squeezing through a metal mesh, by surface rubbing and/or by conditioning by electric field. They also prepared multi-wall carbon nanotube displays. They note that carbon nanotube field emitters having good uniformity were developed using a slurry squeezing and surface rubbing technique. They found that removing metal powder from the uppermost surface of the emitter and aligning the carbon nanotubes by surface treatment enhanced the emission. Single-wall carbon nanotubes were found to have better emission properties than multi-wall carbon nanotubes but single-wall carbon nanotube films showed less emission stability than multi-wall carbon nanotube films. Zettl et al., U.S. Pat. No. 6,057,637 Claim a field emitter material comprising a volume of binder and a volume of $B_xC_yN_z$ nanotubes suspended in the binder, where x, y and z indicate the relative ratios of boron, carbon and nitrogen.

N. M. Rodriguez et al., *J. Catal.* 144, 93 (1993) and N. M. Rodriguez, *J. Mater. Res.* 8, 3233 (1993) discuss the growth and properties of carbon fibers produced by the catalytic decomposition of certain hydrocarbons on small metal particles. The patents U.S. Pat. Nos. 5,149,584, 5,413,866, 5,458,784, 5,618,875 and 5,653,951 disclose uses for such fibers.

There is a continuing need for technology enabling the commercial use of acicular carbon in electron field emitters.

SUMMARY OF THE INVENTION

This invention provides a process for improving the field emission of an electron field emitter comprised of an acicular emitting substance such as acicular carbon, an acicular semiconductor, an acicular metal or a mixture thereof, comprising applying a force to the surface of the electron field emitter such that a portion of the electron field emitter is removed or rearranged thereby forming a new surface of the electron field emitter.

In a preferred embodiment, this invention provides a process for improving the field emission of an electron field emitter comprised of acicular carbon, comprising:

(a) contacting a material with the electron field emitter, wherein the material forms an adhesive contact with the electron field emitter and the adhesive contact provides sufficient adhesive force when the material is separated from the electron field emitter so that a portion of the electron field emitter adheres to the material thereby forming a new surface of said electron emitter; and (b) separating the material from the electron field emitter.

Carbon nanotubes are the preferred acicular carbon. Single wall carbon nanotubes are more preferred and laser ablation grown single wall carbon nanotubes are especially preferred. Preferred for use in this process are electron field emitters in which the carbon nanotubes are less than about 9 wt % of the total weight of the electron field emitter. More preferred are electron field emitters in which the carbon nanotubes are less than about 5 wt % of the total weight of the electron field emitter. Still more preferred are electron field emitters in which the carbon nanotubes are less than about 1 wt % of the total weight of the electron field emitter. Most preferred are electron field emitters in which the carbon nanotubes are about 0.01 wt % to about 2 wt % of the total weight of the electron field emitter.

There is also provided a composition for use as a screen printable paste containing solids comprising carbon nanotubes, wherein the carbon nanotubes are less than 9 wt % of the total weight of solids in the paste. More preferred is the composition wherein the carbon nanotubes are less than 5 wt % of the total weight of solids in the paste. Still more preferred is the composition wherein the carbon nanotubes are less than 1 wt % of the total weight of solids in the paste. Most preferred is the composition wherein the carbon nanotubes are about 0.01 wt % to about 2 wt % of the total weight of solids in the paste. This paste is especially useful in fabricating an electron field emitter, which then undergoes the improvement process of the invention. Such an emitter has excellent emission properties, good adhesion to the substrate along with the advantages of ease of preparing and comparatively low cost of materials and processing.

The improved electron field emitters are useful in flat panel computer, television and other types of displays, vacuum electronic devices, emission gate amplifiers, klystrons and in lighting devices. The process is especially advantageous for producing large area electron field emitters for flat panel displays, i.e., for displays greater than 30 inches (76 cm) in size. The flat panel displays can be planar or curved.

DETAILED DESCRIPTION OF THE INVENTION

Figure 1:
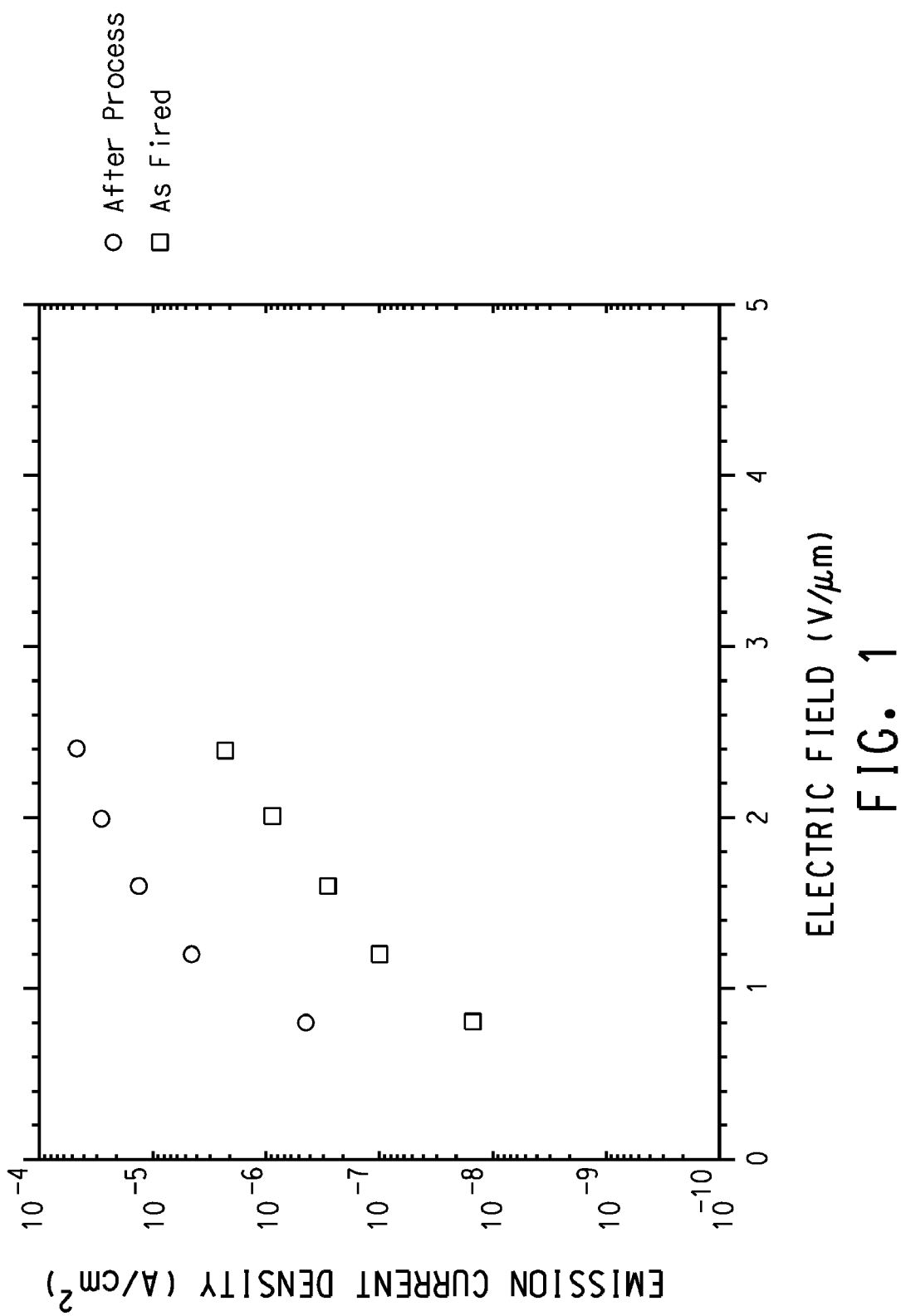
FIG. 1 shows the emission results for the electron field emitter of Example 1 with emission current density plotted as a function of applied electric field for the electron field emitter before and after undergoing the process of the invention for improving emission.

This invention provides a process for improving the field emission of an electron field emitter that is especially effective when the electron field emitter is comprised of acicular emitting substances, e.g., carbon, semiconductor, metal or mixtures thereof. As used herein, "acicular" means particles with aspect ratios of 10 or more. As used herein, "electron field emitter" means the acicular emitting substance and the glass frit, metallic powder or metallic paint or a mixture thereof used to attach the acicular emitting substance to a substrate. Therefore, as used herein, the "total weight of the electron field emitter" means the total weight of the acicular emitting substance and the glass frit, metallic powder or metallic paint or a mixture thereof used to attach the acicular emitting substance to a substrate. The total weight does not include the weight of the substrate, which supports the electron field emitter.

The acicular carbon can be of various types. Carbon nanotubes are the preferred acicular carbon and single wall carbon nanotubes are especially preferred. The individual single wall carbon nanotubes are extremely small, typically about 1.5 nm in diameter. The carbon nanotubes are sometimes described as graphite-like, presumably because of the $sp^2$ hybridized carbon. The wall of a carbon nanotube can be envisioned as a cylinder formed by rolling up a graphene sheet.

Carbon fibers grown from the catalytic decomposition of carbon-containing gases over small metal particles are also useful as the acicular carbon. As used herein, "catalytically grown carbon fibers" means carbon fibers grown from the catalytic decomposition of carbon-containing gases over small metal particles, each of which carbon fibers has graphene platelets arranged at an angle with respect to the fiber axis so that the periphery of the carbon fiber consists essentially of the edges of the graphene platelets. The angle may be an acute angle or 90°.

Other examples of acicular carbon are polyacrylonitrile-based (PAN-based) carbon fibers and pitch-based carbon fibers.

Various processes can be used to attach acicular carbon to a substrate. The means of attachment must withstand and maintain its integrity under the conditions of manufacturing the apparatus into which the field emitter cathode is placed and under the conditions surrounding its use, e.g. typically vacuum conditions and temperatures up to about 450° C. As a result, organic materials are not generally applicable for attaching the particles to the substrate and the poor adhesion of many inorganic materials to carbon further limits the choice of materials that can be used. A preferred method is to screen print a paste comprised of acicular carbon and glass frit, metallic powder or metallic paint or a mixture thereof onto a substrate in the desired pattern and to then fire the dried patterned paste. For a wider variety of applications, e.g., those requiring finer resolution, the preferred process comprises screen printing a paste, which further comprises a photoinitiator and a photohardenable, monomer, photopatterning the dried paste and firing the patterned paste.

The substrate can be any material to which the paste composition will adhere. If the paste is non-conducting and a non-conducting substrate is used, a film of an electrical conductor to serve as the cathode electrode and provide means to apply a voltage to and supply electrons to the acicular carbon will be needed. Silicon, a glass, a metal or a refractory material such as alumina can serve as the substrate. For display applications, the preferable substrate is glass and soda lime glass is especially preferred. For optimum conductivity on glass, silver paste can be pre-fired onto the glass at 500-550° C. in air or nitrogen, but preferably in air. The conducting layer so-formed can then be over-printed with the emitter paste.

The emitter paste used for screen printing typically contains acicular carbon, an organic medium, solvent, surfactant and either low softening point glass frit, metallic powder or metallic paint or a mixture thereof. The role of the medium and solvent is to suspend and disperse the particulate constituents, i.e., the solids, in the paste with a proper rheology for typical patterning processes such as screen printing. There are a large number of such mediums known in the art. Examples of resins that can be used are cellulosic resins such as ethyl cellulose and alkyd resins of various molecular weights. Butyl carbitol, butyl carbitol acetate, dibutyl carbitol, dibutyl phthalate and terpineol are examples of useful solvents. These and other solvents are formulated to obtain the desired viscosity and volatility requirements. A surfactant can be used to improve the dispersion of the particles. Organic acids such oleic and stearic acids and organic phosphates such as lecithin or Gafac® phosphates are typical surfactants.

A glass frit that softens sufficiently at the firing temperature to adhere to the substrate and to the acicular carbon is required. A lead or bismuth glass frit can be used as well as other glasses with low softening points such as calcium or zinc borosilicates. Within this class of glasses, the specific composition is generally not critical If a screen printable composition with higher electrical conductivity is desired, the paste also contains a metal, for example, silver or gold. The paste typically contains about 40 wt % to about 80 wt % solids based on the total weight of the paste. These solids comprise acicular carbon and glass frit and/or metallic components. Variations in the composition can be used to adjust the viscosity and the final thickness of the printed material.

The emitter paste is typically prepared by three-roll milling a mixture of acicular carbon, organic medium, surfactant, a solvent and either low softening point glass frit, metallic powder or metallic paint or a mixture thereof. The paste mixture can be screen printed using well-known screen printing techniques, e.g. by using a 165-400-mesh stainless steel screen. The paste can be deposited as a continuous film or in the form of a desired pattern. When the substrate is glass, the paste is then fired at a temperature of about 350° C. to about 550° C., preferably at about 450° C. to about 525° C., for about 10 minutes in nitrogen. Higher firing temperatures can be used with substrates, which can endure them provided the atmosphere is free of oxygen. However, the organic constituents in the paste are effectively volatilized at 350-450° C., leaving the layer of composite comprised of acicular carbon and glass and/or metallic conductor. The acicular carbon appears to undergo no appreciable oxidation or other chemical or physical change during the firing in nitrogen.

If the screen-printed paste is to be photopatterned, the paste contains a photoinitiator, a developable binder and a photohardenable monomer comprised, for example, of at least one addition polymerizable ethylenically unsaturated compound having at least one polymerizable ethylenic group.

A preferred composition for use as a screen printable paste is one containing solids comprising carbon nanotubes, wherein the carbon nanotubes are less than 9 wt % of the total weight of solids in the paste. More preferred is the composition wherein the carbon nanotubes are less than 5 wt % of the total weight of solids in the paste. Still more preferred is the composition wherein the carbon nanotubes are less than 1 wt % of the total weight of solids in the paste. Most preferred is the composition wherein the carbon nanotubes are about 0.01 wt % to about 2 wt % of the total weight of solids in the paste. This paste is especially useful in fabricating an electron field emitter, which is a preferred embodiment of an electron field emitter to undergo the improvement process of the invention. These compositions with a low concentration of carbon nanotubes provide an excellent electron field emitter after the electron field emitter undergoes the improvement process. Typically, a paste comprising carbon nanotubes, silver and glass frit will contain about 0.01-6.0 wt % nanotubes, about 40-75 wt % silver in the form of fine silver particles and about 3-15 wt % glass frit based on the total weight of the paste.

Electron field emitters can undergo the improvement process before or after the firing step discussed previously; however, it is preferred to have them fired before undergoing the process.

The process for improving the field emission of an electron field emitter comprised of an acicular emitting substance such as acicular carbon, an acicular semiconductor, an acicular metal or mixtures thereof comprises applying a force to the surface of the electron field emitter in a direction essentially normal to the plane of the electron field emitter such that a portion of the electron field emitter is removed or rearranged thereby forming a new surface of the electron field emitter. It is believed that the newly formed surface of the electron field emitter has acicular particles protruding from it.

One embodiment of the process can be envisioned as a fracturing of the electron field emitter to provide a new emitting surface. This aspect of the process has been demonstrated by screen printing two electron field emitters comprised of acicular carbon onto two separate substrates. A sandwich structure was then formed by contacting the two screen-printed electron field emitters so that the substrates formed the two outer layers. The structure was then fired as described previously so that the two screen-printed electron field emitters formed a single fired emitter sandwiched between the two substrates. The substrates were then pulled apart, fracturing the electron field emitter material. The two electron field emitters showed improved emission properties over electron field emitters prepared by simply screen printing and firing.

A preferred embodiment of the process of this invention has been demonstrated with electron field emitters comprised of acicular carbon. A material is contacted with the electron field emitter. The material forms an adhesive contact with the electron field emitter and the adhesive contact provides sufficient adhesive force when the material is separated from the electron field emitter so that a portion of the electron field emitter is removed thereby forming a new surface of the electron field emitter. The material is then separated from the electron field emitter. Under certain conditions, when the material which forms the adhesive contact is separated from the electron field emitter, little or none of the electron field emitter is removed but the surface of the electron field emitter is rearranged to form a new surface and the newly formed surface of the electron field emitter has acicular particles protruding from it. While the material, which forms the adhesive contact with the electron, field emitter is in contact with the electron field emitter there is no translational motion by the material with respect to the electron field emitter. The only motion of the material occurs during the contacting and separating steps and this motion is in direction essentially perpendicular to the plane of the electron field emitter.

Any material that provides sufficient adhesive force can be used. Such material can be applied in solid or liquid form as a film or a coating. Such an adhesive force can be chemical, dispersive, electrostatic, magnetic, viscoelastic or mechanical in nature. The adhesive force may be imparted by a separate step such as heating, light illumination, or lamination with or without applied pressure. Commercial adhesive tape is a readily available and convenient material especially for small electron field emitter surfaces. Any of the commercial transparent or invisible tapes, masking tapes, duct tapes, sealing tapes, etc. can be used as the material to provide the adhesive force.

Pieces of tape can be contacted with and removed from the same electron field emitter more then one time and each time the electron field emitter shows improved emission over the results obtained with electron field emitters that had not undergone the process of the invention.

A thermally softened polymer film can also be used as the material that provides the adhesive contact with the electron field emitter. Such a film is especially useful with large electron field emitter surfaces. A wide variety of polymers such as acrylics (e.g. Carboset® XPD-2264 available from B. F. Goodrich Company, Charlotte, N.C.), ethylene/acrylic elastomers (e.g. Vamac®, available from E. I. du Pont de Nemours and Company, Wilmington, Del.), polyamides (e.g. the nylon multipolymer resin Elvamide®, available from E. I. du Pont de Nemours and Company, Wilmington, Del.), block copolymer of styrene, butadiene, and isoprene (e.g. Kraton® available from Shell Chemical Company, A Division of Sheel Oil Company, Houston, Tex.) and co-polymers of ethylene and vinyl acetate (e.g. Elvax® available from E. I. du Pont de Nemours and Company, Wilmington, Del.), thermoplastic ethylene methacrylic acid copolymers (e.g. Nucrel® available from E. I. du Pont de Nemours and Company, Wilmington, Del.), ionomers (e.g. Surlyng available from E. I. du Pont de Nemours and Company, Wilmington, Del.), Bynel® CXA coextrudable adhesive resins available from E. I. du Pont de Nemours and Company, Wilmington, Del. and mixtures thereof can be used for this purpose. The thermal and adhesive properties of the soft polymer can be further customized by blending with monomer, tackifiers, and plasticizers.

A metallic piece of adhesive tape was contacted with and removed from an electron field emitter. A portion of the electron field emitter adhered to the metallic tape and when tested for emission showed emission properties improved over that of the electron emitter before undergoing the process of the invention for improving emission. It is believed that in this instance the acicular carbon particles in the electron field emitter material adhered to the tape protrude from the surface of the electron field emitter material.

The electron field emitters with the improved emission properties provided by this invention can be used in the cathodes of electronic devices such as triodes and in particular in field emission display devices. Such a display device comprises (a) a cathode using an electron field emitter that had undergone the process of the invention for improving emission, (b) a patterned optically transparent electrically conductive film serving as an anode and spaced apart from the cathode, (c) a phosphor layer capable of emitting light upon bombardment by electrons emitted by the electron field emitter and positioned adjacent to the anode and between the anode and the cathode, and (d) one or more gate electrodes disposed between the phosphor layer and the cathode. The use of an adhesive material to improve the emission properties of an electron field emitter is readily adapted to large size electron field emitters that can be used in the cathodes of large size display panels.

The process of this invention for improving the emission of an electron field emitter is conducive to fabricating completely screen-printed triodes. The electron field emitter can be subjected to the improvement process immediately after it is screen printed and fired or, preferably, after any dielectric materials and gate electrodes have been screen printed onto the cathode and fired.

The accuracy and resolution attained with screen printing are limited. Therefore, it is difficult to fabricate a triode with dimensions less than 100 µm. Preventing electrical shorting between the gate and emitter layers is difficult due to printing inaccuracy. In addition, since the features on each layer must be printed one layer at a time, repeated repositioning of different screens further degrades registration. In order to prevent shorting, the gate layer opening is often enlarged relative to the dielectric via and this significantly degrades the effectiveness of the gate-switching field due to increased gate to emitter distance.

A photoimagable thick film approach can solve all of the aforementioned problems and is useful for forming an array of normal gate triodes as well as for forming an array of inverted-gate triodes. A normal gate triode has the gate electrode physically between the field emitter cathode and the anode. An inverted-gate triode has the field emitter cathode physically between the gate and the anode. Photoimagable thick film formulations such as the Fodel® silver and dielectric paste compositions (DC206 and DG201 respectively) are available from E. I. du Pont de Nemours and Company, Wilmington, Del. They contain silver or dielectric in the form of fine particles and a small amount of low melting glass frit in an organic medium containing photoimagable ingredients such as photoinitiator and photomonomers. Typically, a uniform layer of Fodel® paste is screen printed on a substrate with controlled thickness. The layer is baked in low heat to dry. A contact photo-mask with the desired pattern is placed in intimate contact with the film and exposed to ultra-violet (UV) radiation. The film is then developed in weak aqueous sodium carbonate. Feature dimensions as small as 10 µm can be produce by photoimaging these screen-printed thick films. Therefore, triode dimensions as small as 25 µm may be achieved. In addition, imaging can be carried out in multi-layers thus eliminating alignment accuracy problems. This is advantageous in the fabrication of the normal gate triode since the silver gate and dielectric layers can be imaged together to achieve perfect alignment between the gate and dielectric openings and in the fabrication of the inverted gate triode since the emitter, silver cathode, and dielectric layers can be imaged together to achieve perfect capping of the dielectric ribs while avoiding short formation. For normal gate triodes with small via dimensions, it is preferred that the material providing the adhesive force in the process of the invention is applied in liquid form. This liquid adhesive is selected for a balance of adhesive, thermal and viscoelastic properties. A polymer solution or melt or a liquid pre-polymer containing thermal or ultra-violet curable polymer can be used.

The process of this invention for improving the emission of an electron field emitter is also conducive to fabricating a lighting device. Such a device comprises (a) a cathode using an electron field emitter that has undergone the process of the invention for improving emission and (b) an optically transparent electrically conductive film serving as an anode and spaced apart from the cathode and (c) a phosphor layer capable of emitting light upon bombardment by electrons emitted by the electron field emitter and positioned adjacent to the anode and between the anode and the cathode. The cathode may consist of an electron field emitter in the form of a square, rectangle, circle, ellipse or any other desirable shape with the electron field emitter uniformly distributed within the shape or the electron field emitter may be patterned. Screen printing is a convenient method for forming the electron field emitter.

The presence of emission hot spots is a major disadvantage of any approach for forming the electron field emitter that involves having a "collection of random emitters", e.g., using an emitter paste comprised of acicular carbon such as nanotubes. To minimize hot spots, emitter pastes should be made as uniform as possible by using fine grain ingredients and mixing and dispersion methods well known in the art. However, since it is ultimately not possible to control the exact aspect ratio, orientation, and the local environment of each and every nanotube in a printed thick film surface, a natural statistical distribution of turn-on voltages for the individual nanotube emitters is expected. For uniform emission, this distribution should be as narrow as possible. The nanotubes populating the low field side of this distribution will emit significantly higher current than the majority at a given field, resulting in emission hot spots. Hot spots clearly limit the achievable uniformity and contrast of a display. In addition, hot spots can also severely limit the maximum dc anode voltage applied prior to the on-set of uncontrolled emission. This lower anode voltage in turn increases the required switching gate voltage and reduces the display brightness due to reduced phosphor efficiency. Therefore it is of great importance to discover ways to selectively "quench" the hot spots without damaging the general emission characteristic of the emitters. It has been found that the use of a reactive gas and gas plasma dramatically reduces hot spot emission and increases the achievable anode voltage prior to the on-set of uncontrolled emission. In addition, the hot spots were eliminated without damage to general emission.

To selectively eliminate hot spots, a process must take advantage of the fact that hot spots consist of areas with abnormally high local emission current and electric field. This in turn creates local heating of the hot emitters and ionization of reactive gas in the immediate surrounding of the emitters. It is believed that the quenching process works by selectively reacting the carbon nanotubes at a hot spot with the highly reactive gas and plasma surrounding the hot emitters without any detrimental effect on the general emitter population that is not emitting electrons during the process. The self-terminating nature of this process is also consistent with this mechanism. When emission subsides, so do heating and plasma generation, thus terminating the process. Oxygen can be used as the gas. Other reactive gases and vapors, such as but not limited to ozone, hydrogen, halogens, hydrocarbon, and fluoro-chloro-carbons may also be effective.

Field emission tests were carried out on the resulting samples using a flat-plate emission measurement unit comprised of two electrodes, one serving as the anode or collector and the other serving as the cathode. The cathode consists of a copper block mounted in a polytetrafluoroethylene (PTFE) holder. The copper block is recessed in a 1 inch by 1 inch (2.5 cm×2.5 cm) area of PTFE and the sample substrate is mounted to the copper block with electrical contact being made between the copper block and the sample substrate by means of copper tape. A high voltage lead is attached to the copper block. The anode is held parallel to the sample at a distance, which can be varied, but once chosen it was held fixed for a given set of measurements on a sample. Unless stated otherwise was a spacing of 1.25 mm was used. The anode consists of a glass plate coated with indium tin oxide deposited by chemical vapor deposition. It is then coated with a standard ZnS-based phosphor, Phosphor P-31, Type 139 obtained from Electronic Space Products International. An electrode is attached to the indium tin oxide coating.

The test apparatus is inserted into a vacuum system, and the system was evacuated to a base pressure below $1\times10^{-5}$ torr ($1.3\times10^{-3}$ Pa). A negative voltage pulse with typical pulse width of 3 μsec at a frequency of 60 Hz is applied to the cathode and the emission current was measured as a function of the applied voltage. The image emitted by the phosphor as a result of the emission current is recorded with a camera.

EXAMPLES OF THE INVENTION

Example 1

This Example demonstrates the good emission exhibited by an electron field emitter comprised of single wall carbon nanotubes after undergoing the process of the invention for improving emission.

Laserablation grown single wall nanotubes were obtained from Tubes @ Rice, Rice University, Houston, Tex. as a suspension in water. 20 ml of this suspension was diluted with 40 ml of distilled water and milled on a media mill for 2 hours. The resultant material was centrifuged for 2 hours at 5000 rpm and the supernatant liquid removed. A sludge remained which was found to contain 5% nanotube solids by a thermogravimetric analysis determination. 1 gram of this material was added to 0.05 grams of a glass frit, Bayer PK 8701 (CAS Registry No. 65997-18-4) and 1.5 grams of a typical organic medium composed primarily of ethylcellulose in terpineol. These ingredients were mixed on a glass plate muller for 75 rotations to form the emitter paste. A pre-fired silvered glass substrate was prepared by screen printing a mixture of silver powder and a low melting glass frit in a typical organic ethylcellulose-based medium onto glass, followed by firing at 525° C. A 1 cm² square pattern of emitter paste was then screen printed onto the pre-fired silvered glass substrate using a 325 mesh screen and the sample was subsequently dried at 120° C. for 10 minutes. The dried sample was then fired in nitrogen for 10 minutes at 450-525° C. After firing the nanotube/glass composite forms an adherent coating on the substrate. This electron field emitter was tested for field emission as described in the specification. After the emission test, a piece of Scotch™ Magic™ Tape, (#810-3M Company) was applied to and contacted with the electron field emitter and then removed. A portion of the electron field emitter adhered to the Scotch™ Magic™ Tape. The electron field emitter was then tested for field emission. FIG. 1 shows the emission results for the electron field emitter both as prepared and after undergoing the process of the invention for improving emission with emission current density plotted as a function of applied electric field. The emission current is greatly improved as a result of the process of the invention. Example 2

This Example demonstrates the good emission exhibited by an electron field emitter comprised of single wall carbon nanotubes after undergoing the process of the invention for improving emission.

Figure 2:
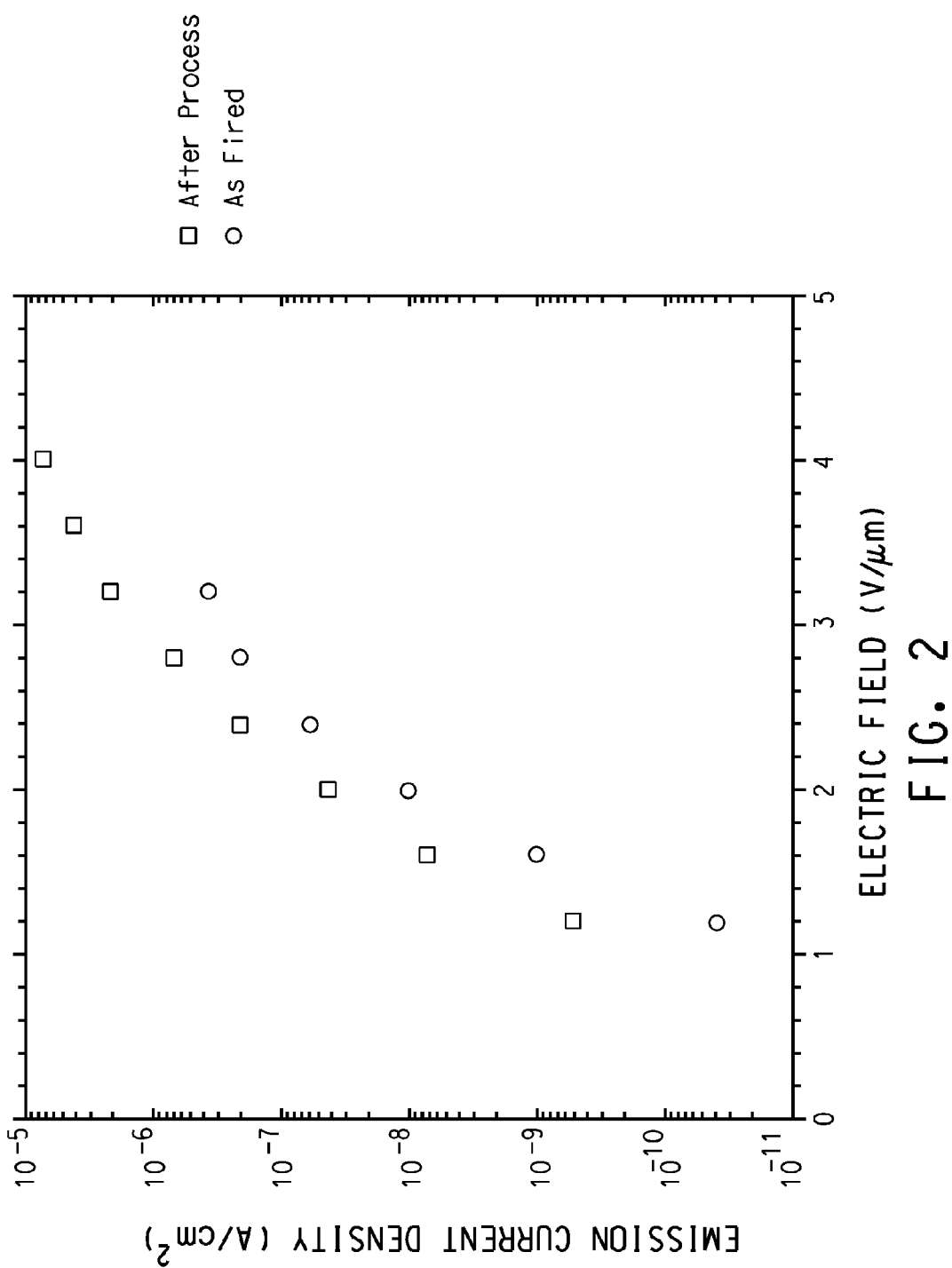
FIG. 2 shows the emission results for the electron field emitter of Example 2 with emission current density plotted as a function of applied electric field for the electron field emitter before and after undergoing the process of the invention for improving emission.

Carbolex AP-Grade single wall carbon nanotubes were obtained as a powder from Carbolex Inc., Lexington, Ky. 0.11 gram of this material was added to 0.75 grams of a typical organic medium composed primarily of ethylcellulose in terpineol. These ingredients were mixed on a glass plate muller for 75 rotations to form the emitter paste. A pre-fired silvered glass substrate was prepared by screen printing a mixture of silver powder and a low melting glass frit in a typical organic ethylcellulose-based medium onto glass, followed by firing at 525° C. A 1 $cm^2$ square pattern of emitter paste was then screen printed onto the pre-fired silvered glass substrate using a 325 mesh screen and the sample was subsequently dried at 120° C. for 10 minutes. The dried sample was then fired in nitrogen for 10 minutes at 450° C. After firing the nanotube paste forms an adherent coating on the substrate. This electron field emitter was tested for field emission as described in the specification. After the emission test, a piece of Scotch™ Magic™ Tape, (#810-3M Company) was applied to and contacted with the electron field emitter and then removed. A portion of the electron field emitter adhered to the Scotch™ Magic™ Tape. The electron field emitter was then tested for field emission. FIG. 2 shows the emission results for the electron field emitter both as prepared and after undergoing the process of the invention for improving emission with emission current density plotted as a function of applied electric field. The emission current is greatly improved as a result of the process of the invention.

Example 3

This Example demonstrates the good emission exhibited by an electron field emitter comprised of catalytically grown carbon fibers after undergoing the process of the invention for improving emission.

Figure 3:
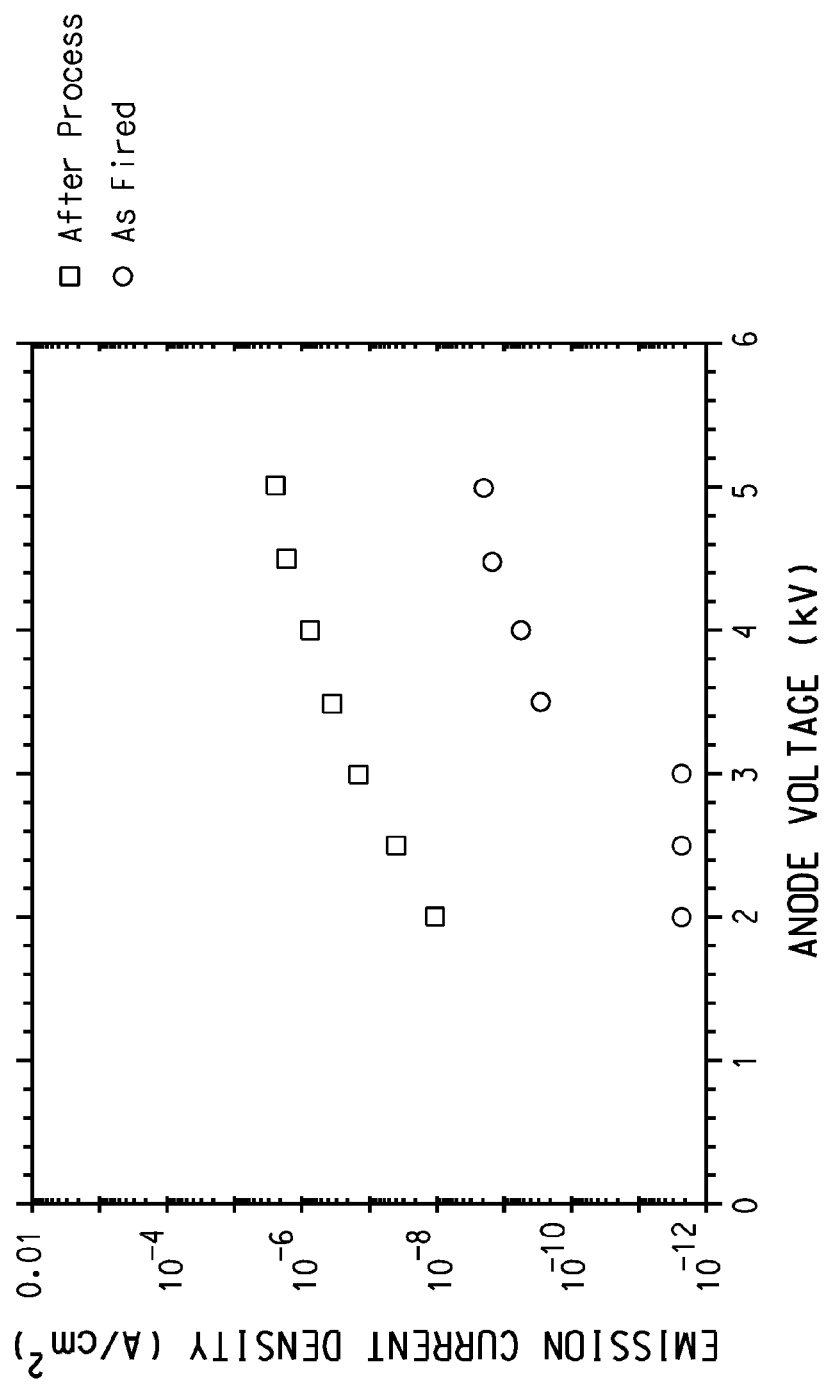
FIG. 3 shows the emission results for the electron field emitter of Example 3 with emission current plotted as a function of applied voltage for the electron field emitter before and after undergoing the process of the invention for improving emission.

Catalytically grown carbon fibers were obtained as a powder from Catalytic Materials Ltd, 12 Old Stable Drive, Mansfield, Mass. 0.1513 grams of these catalytically grown carbon fibers were added to 0.1502 grams of glass, Bayer PK 8701 (CAS Registry No. 65997-18-4), and 1.5012 grams of a typical organic medium composed primarily of ethylcellulose in terpineol. These ingredients were mixed on a glass plate muller for 75 rotations to form the emitter paste. A pre-fired silvered glass substrate was prepared by screen printing a mixture of silver powder and a low melting glass frit in a typical organic ethylcellulose-based medium onto glass, followed by firing at 525° C. A 1 $cm^2$ square pattern of emitter paste was then screen printed onto the pre-fired silvered glass substrate using a 325 mesh screen and the sample was subsequently dried at 120° C. for 10 minutes. The dried sample was then fired in nitrogen for 10 minutes at 450° C. After firing the catalytically grown carbon fiber/glass composite forms an adherent coating on the substrate. This electron field emitter was tested for field emission as described in the specification. After the emission test, a piece of Scotch™ Magic™ Tape, (#810-3M Company) was applied to and contacted with the electron field emitter and then removed. A portion of the electron field emitter adhered to the Scotch™ Magic™ Tape. The electron field emitter was then tested for field emission. FIG. 3 shows the emission results for the electron field emitter both as prepared and after undergoing the process of the invention for improving emission with emission current plotted as a function of applied voltage. The emission current has improved by at least three orders of magnitude, i.e., a factor of more than 1000, for each of the voltages measured as a result of the process of this invention.

Example 4

This Example demonstrates the good emission exhibited by an electron field emitter comprised of vapor grown carbon fibers after undergoing the process of the invention for improving emission.

Figure 4:
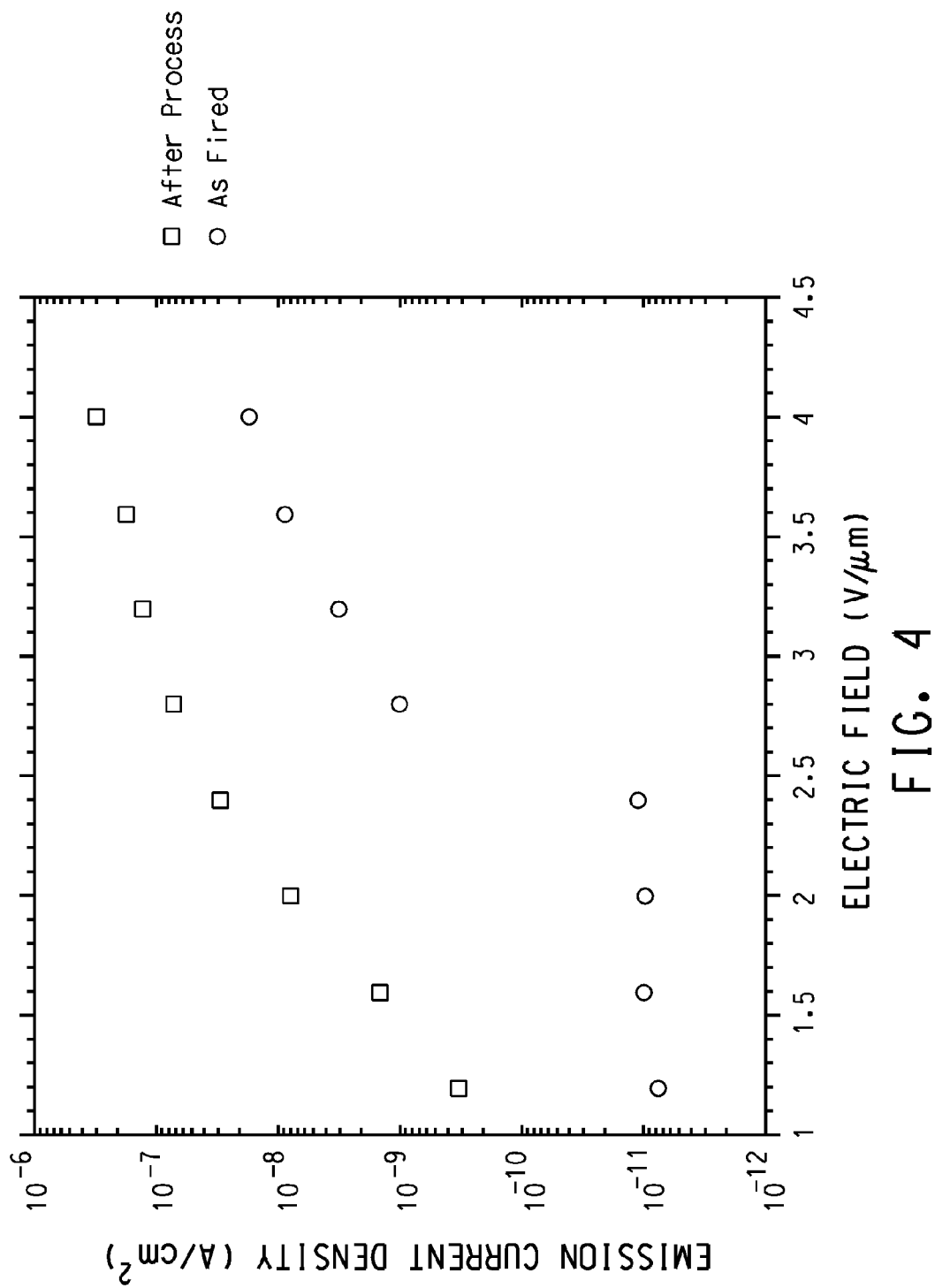
FIG. 4 shows the emission results for the electron field emitter of Example 4 with emission current density as a function of applied electric field for the electron field emitter before and after undergoing the process of the invention for improving emission.

Vapor grown carbon fibers were obtained as a powder from Showa Denko America, San Mateo, Calif. 0.11 gram of this material was added to 0.75 grams of a typical organic medium composed primarily of ethylcellulose in terpineol. These ingredients were mixed on a glass plate muller for 75 rotations to form the emitter paste. A pre-fired silvered glass substrate was prepared by screen printing a mixture of silver powder and a low melting glass frit in a typical organic ethylcellulose-based medium onto glass, followed by firing at 525° C. A 1 $cm^2$ square pattern of emitter paste was then screen printed onto the pre-fired silvered glass substrate using a 325 mesh screen and the sample was subsequently dried at 120° C. for 10 minutes. The dried sample was then fired in nitrogen for 10 minutes at 450° C. After firing the vapor grown carbon fiber paste forms an adherent coating on the substrate. This electron field emitter was tested for field emission as described in the specification. After the emission test, a piece of Scotch™ Magic™ Tape, (#810-3M Company) was applied to and contacted with the electron field emitter and then removed. A portion of the electron field emitter adhered to the Scotch™ Magic™ Tape. The electron field emitter was then tested for field emission. FIG. 4 shows the emission results for the electron field emitter both as prepared and after undergoing the process of the invention for improving emission with emission current density plotted as a function of applied electric field. The emission current is greatly improved as a result of the process of the invention.

Examples 5-8

These Examples demonstrate the use of carbon nanotube/silver emitter paste with low concentrations of single wall carbon nanotubes to screen print electron field emitters and the good emission exhibited by these electron field emitters after undergoing the process of the invention for improving emission.

The emitter pastes for Examples 5-8 were prepared by mixing two components, one a paste containing single wall carbon nanotubes and the other a silver paste. Laser ablation grown single wall carbon nanotubes were obtained from Tubes @ Rice, Rice University, Houston, Tex. as a suspension in toluene (7.7 grams nanotubes per liter of toluene). A portion of this suspension was mixed with the typical organic medium composed primarily of ethylcellulose in terpineol to form a nanotube paste. The quantity of nanotubes in this nanotube paste was 0.29 wt %. The silver paste was a silver paste composition 7095 available from E. I. du Pont de Nemours and Company, Wilmington, Del. containing 65.2 wt % silver in the form of fine silver particles and a small amount of glass frit in an organic medium. The emitter pastes for Examples 5-8 were prepared by combining the nanotube/silver pastes in the ratios by weight of 80/20, 60/40, 40/60 and 20/80 respectively. Each of these combinations were mixed on a glass plate muller for 75 rotations to form the emitter paste. A pre-fired silvered glass substrate was prepared for each Example by screen printing a mixture of silver powder and a low melting glass frit in a typical organic ethylcellulose-based medium onto glass, followed by firing at 525° C. For each Example, a 9/16 inch (1.43 cm) square pattern of emitter paste was then screen printed onto the pre-fired silvered glass substrate using a 325 mesh screen and the sample was subsequently dried at 120° C. for 10 minutes. The dried sample was then fired in nitrogen for 10 minutes at 450° C. After firing the nanotube/silver composite forms an adherent coating on the substrate. These fired electron field emitters of Examples 5-8 respectively contained 3.49 wt %, 1.34 wt %, 0.60 wt % and 0.23 wt % nanotubes in a silver matrix where the weight percentages were calculated neglecting the small amount of glass present. The actual weight percentages of the nanotubes on the basis of the total weight of the electron field emitter would therefore be slightly lower. Each electron field emitter was then tested for electron field emission as described previously. Only discrete emission sites were observed and the total emission current was low for each Example even at high electric fields. After the emission test, a piece of Scotch™ Magic™ Tape, (#810-3M Company) was applied to and contacted with the electron field emitter of each Example and then removed. A portion of each electron field emitter adhered to the Scotch™ Magic™ Tape. The electron field emitter of each Example was then tested for field emission and each showed a uniform and high density emission across the entire surface of the electron field emitter. The currents observed for the electron field emitters of Examples 5 and 6 with applied voltages of 2 kV were 30 and 27 µA respectively and those observed for the electron field emitters of Examples 7 and 8 with applied voltages of 2.5 kV were 17 and 15 µA respectively, all orders of magnitude higher in current than observed before the electron field emitters underwent the process of the invention for improving emission.

Examples 9-11

These Examples demonstrate the use of carbon nanotube/dielectric emitter paste with low concentrations of single wall carbon nanotubes to screen print electron field emitters and the good emission exhibited by these electron field emitters after undergoing the process of the invention for improving emission.

The emitter pastes for Examples 9-11 were prepared by mixing two components, one a paste containing single wall carbon nanotubes and the other a paste containing a dielectric. Laser ablation grown single wall carbon nanotubes were obtained from Tubes @ Rice, Rice University, Houston, Tex. as a suspension in toluene (7.7 grams nanotubes per liter of toluene). A nanotube paste was prepared by mixing two portions by weight of this suspension with one portion by weight of ethylcellulose binder in terpineol. The dielectric paste was prepared from a mixture of a low softening bismuth borate frit, alumina filler, ethylcellulose binder, <1% of blue pigment, <1% of a phospate surfactant, and terpineol.

Figure 5:
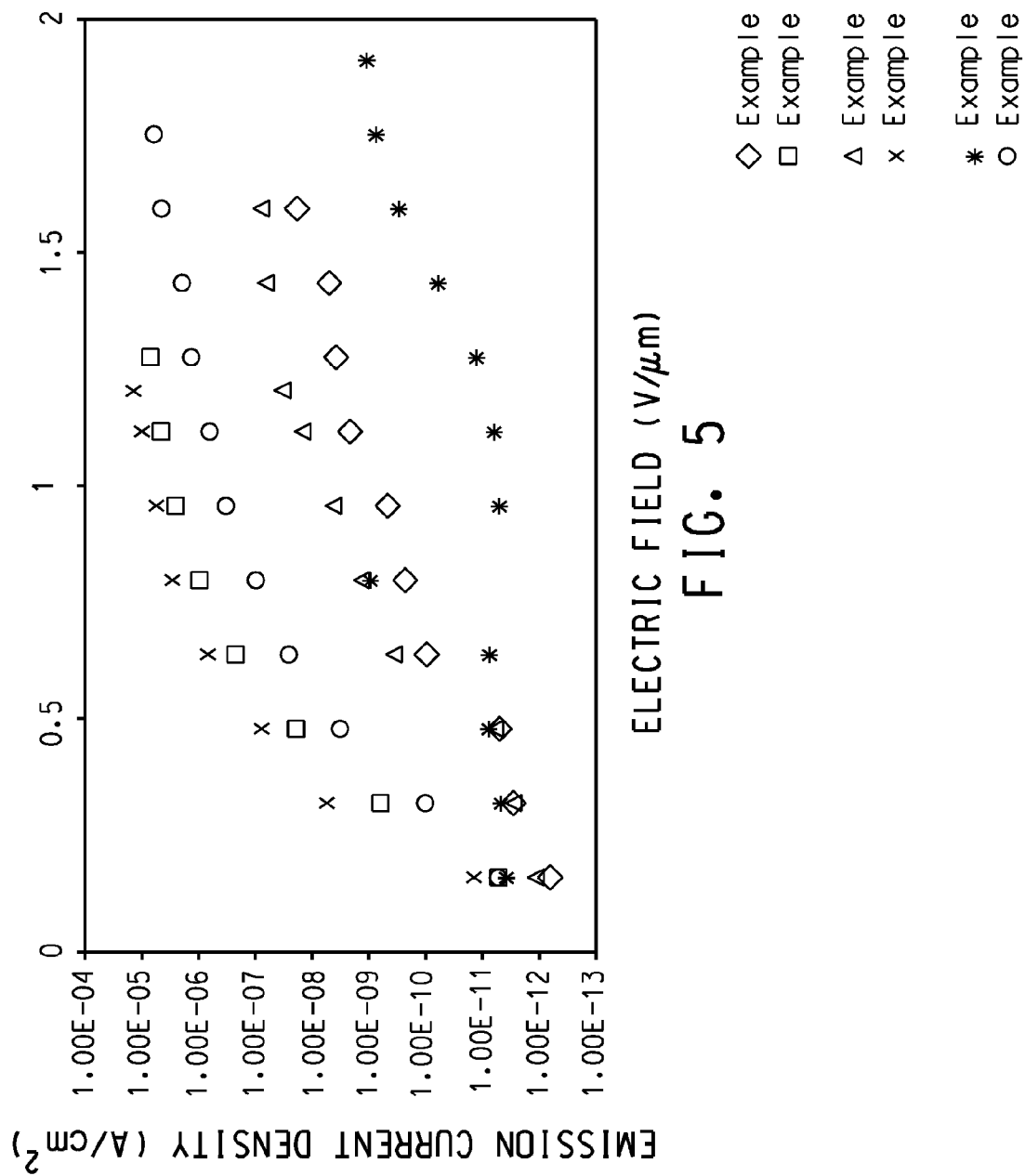
FIG. 5 shows the emission results for the electron field emitter of Examples 9-11 with emission current density plotted as a function of applied electric field for the electron field emitter before and after undergoing the process of the invention for improving emission.
Figure 6A:
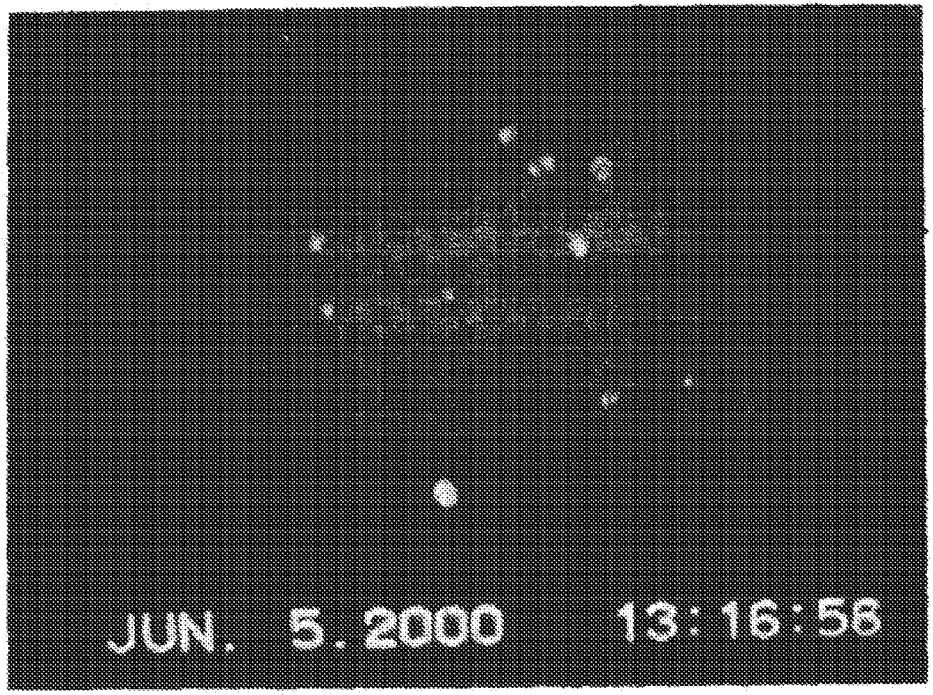
FIG. 6 has photographs of the light emitted from a phosphor layer impinged by electron emission from the electron field emitters of Examples 9-11 before and after undergoing the process of the invention for improving emission.
Figure 6B:
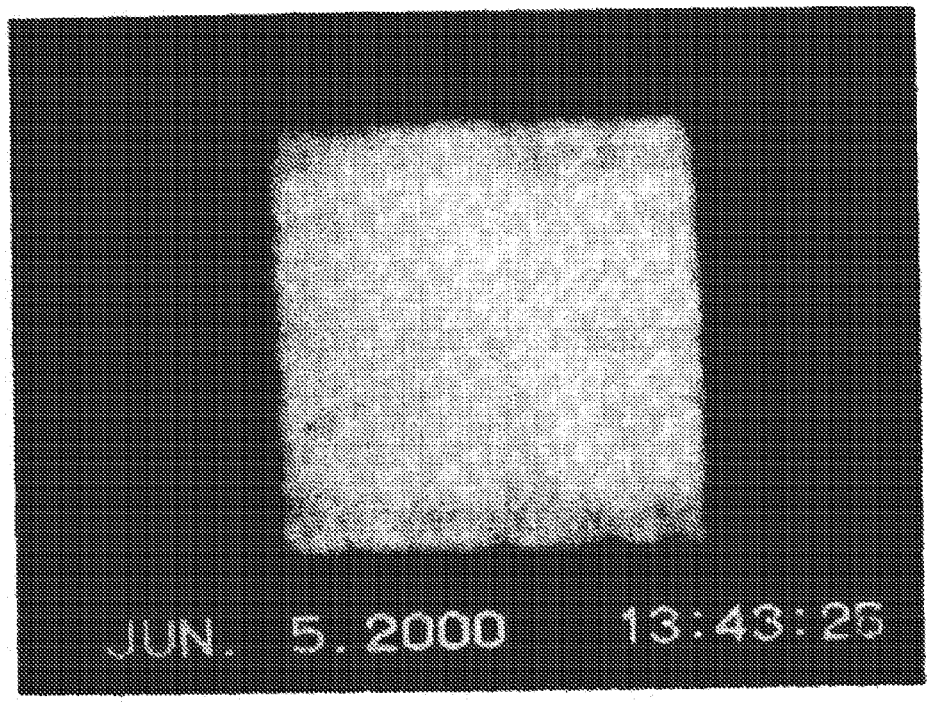
Figure 6C:
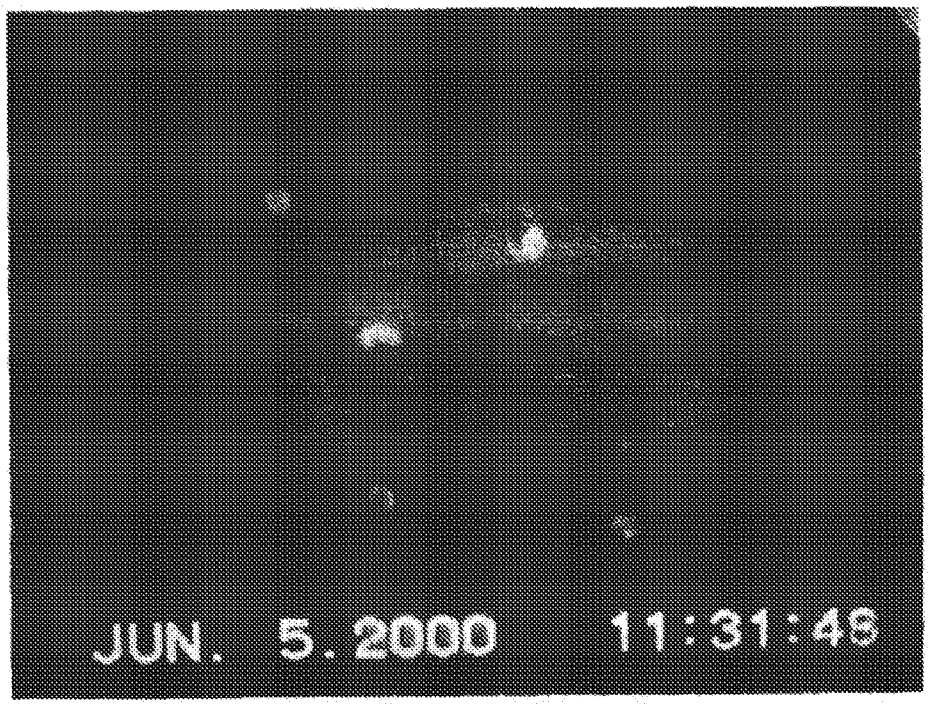
Figure 6D:
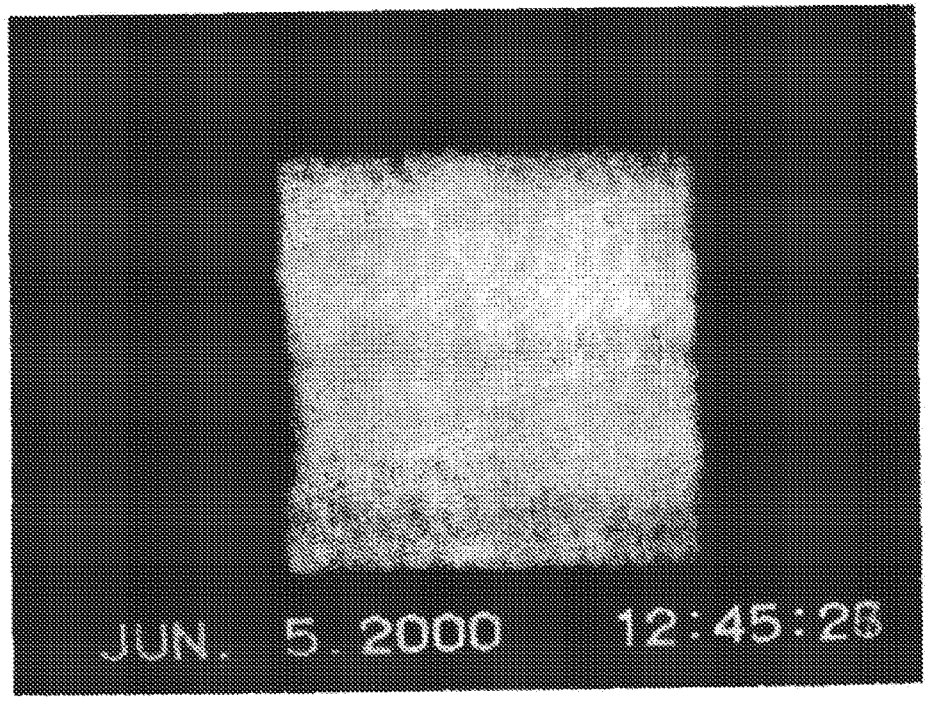
Figure 6E:
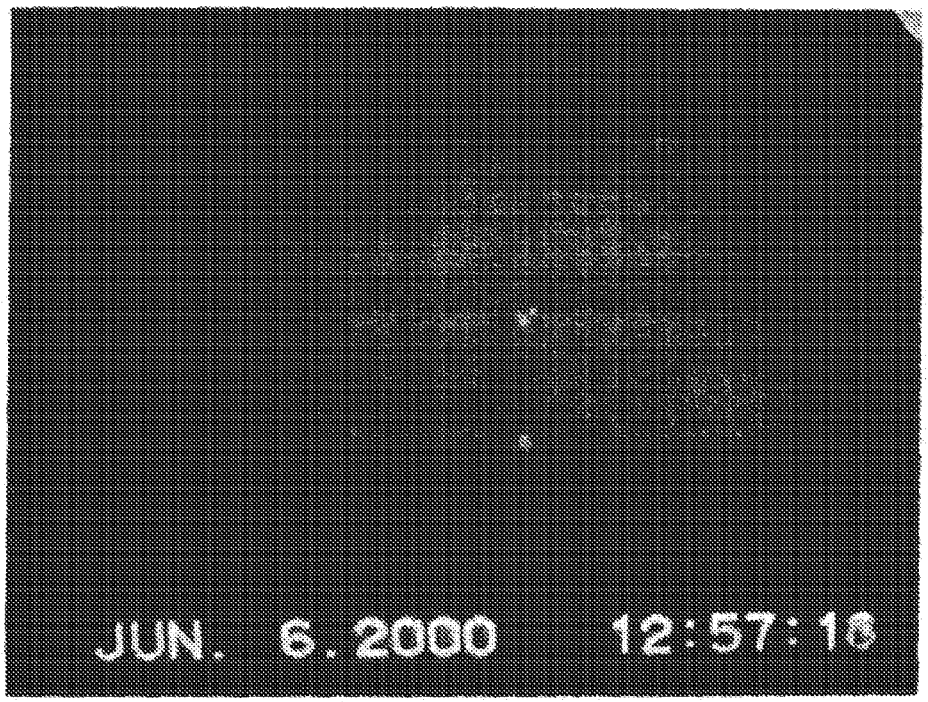
Figure 6F:
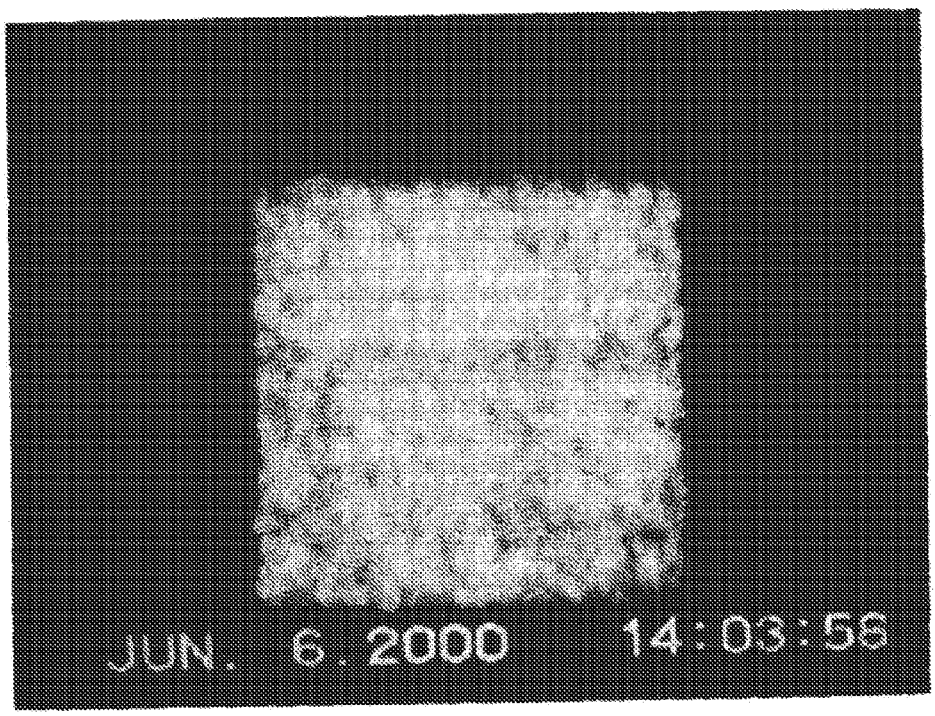

The emitter pastes for Examples 9-11 were prepared by combining the nanotube/dielectric pastes in the ratios by weight of 2/3, 1.2/1.55 and 1/4 respectively. Each of these combinations were mixed on a glass plate muller for 75 rotations to form the emitter paste. A pre-fired silvered glass substrate was prepared for each Example by screen printing a mixture of silver powder and a low melting glass frit in a typical organic ethylcellulose-based medium onto glass, followed by firing at 525° C. For each Example, a 9/16 inch (1.43 cm) square pattern of emitter paste was then screen printed onto the pre-fired silvered glass substrate using a 325 mesh screen and the sample was subsequently dried at 120° C. for 10 minutes. The dried sample was then fired in nitrogen for 10 minutes at 450° C. After firing the nanotube/dielectric composite forms an adherent coating on the substrate. These fired electron field emitters of Examples 9-11 respectively contained 0.47 wt %, 0.91 wt %, and about 0.07 wt % nanotubes in the dielectric matrix where the weight percentages were calculated on the basis of the total weight of the electron field emitter. Each electron field emitter was then tested for electron field emission as described previously. Only discrete emission sites were observed. After the emission test, a piece of Scotch™ Magic™ Tape, (#810-3M Company) was applied to and contacted with the electron field emitter of each Example and then removed. A portion of each electron field emitter adhered to the Scotch™ Magic™ Tape. The electron field emitter of each Example was then tested for field emission and each showed a uniform and high density emission across the entire surface of the electron field emitter. FIG. 5 shows the emission results for the electron field emitter both as prepared and after undergoing the process of the invention for improving emission for each of the three Examples with emission current density plotted as a function of applied electric field. FIGS. 6a and 6b are photographs of the light emitted from a phosphor layer impinged by electron emission from the electron field emitter of Example 9 before and after undergoing the process of the invention for improving emission. FIGS. 6c and 6d are photographs of the light emitted from a phosphor layer impinged by electron emission from the electron field emitter of Example 10 before and after undergoing the process of the invention for improving emission. FIGS. 6e and 6f are photographs of the light emitted from a phosphor layer impinged by electron emission from the electron field emitter of Example 11 before and after undergoing the process of the invention for improving emission. The emission current is greatly improved as a result of the process of the invention for the electron field emitters of all three Examples.

Example 12

This Example demonstrates the good emission exhibited by an electron field emitter comprised of single wall carbon nanotubes after undergoing the process of the invention for improving emission.

Figure 7:
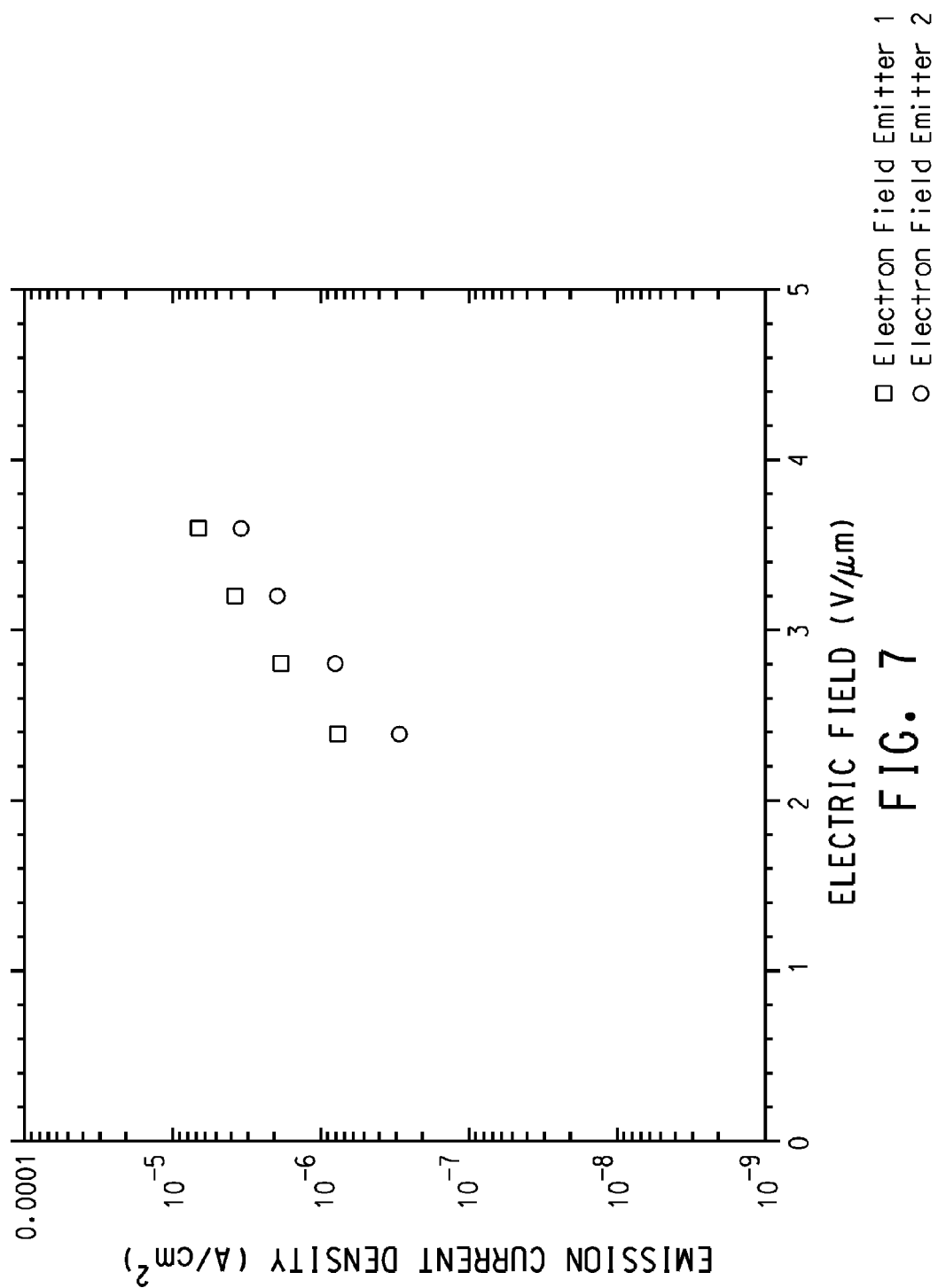
FIG. 7 shows the emission results for the two electron field emitters created in Example 7 with emission current density plotted as a function of applied electric field for both electron field emitters.

Carbolex AP-Grade single wall carbon nanotubes were obtained as a powder from Carbolex Inc., Lexington, Ky. 0.11 gram of this material was added to 0.75 rams of a typical organic medium composed primarily of ethylcellulose in terpineol. These ingredients were mixed on a glass plate muller for 75 otations to form the emitter paste. Two essentially identical screen-printed emitter paste samples were prepared. Two pre-fired silvered glass substrates were prepared by screen printing a mixture of silver powder and a low melting glass frit in a typical organic ethylcellulose-based medium onto two pieces of glass, followed by firing at 525° C. A 1 cm² square pattern of emitter paste was then screen printed onto each of the pre-fired silvered glass substrates using a 325 mesh screen and the samples were subsequently dried at 120° C. for 10 minutes. A sandwich structure of substrate-emitter paste-substrate was formed by contacting the two emitter paste samples and lightly pressing together the two substrates. The sandwich structure was then fired in nitrogen for 10 minutes at 450° C. The two substrates were then separated from one another by pulling them apart thereby fracturing the fired emitter paste and providing two electron field emitters each having a newly formed surface. Each electron field emitter was tested for emission as described previously. FIG. 7 shows the emission results for both electron field emitters with emission current density plotted as a function of applied electric field. Both electron field emitters show higher emission than an electron field emitter, which has been fired but not subjected to other treatment, the results for which are shown in FIG. 2. In this Example no adhesive tape was required. The improvement is achieved during the separation of the substrates following firing and the resulting fracture of the fired emitter paste.

Examples 13-14

These Examples demonstrates the use of a thermally softened polymer film as the material to provide the adhesive force with the electron field emitter.

The emitter paste for these Examples was prepared by mixing three components: one a suspension containing single wall carbon nanotubes, one a typical organic medium containing 10% ethylcellulose and 90% beta-terpineol, and one a typical paste containing silver. Laser ablation grown single wall carbon nanotubes were obtained from Tubes @ Rice, Rice University, Houston, Tex. as an unpurified powder produced by laser ablation. A nanotube suspension was prepared by sonicating, i.e. by mixing ultrasonically, a mixture containing 1% by weight of the nanotube powder and 99% by weight of trimethylbenzene. The ultrasonic mixer used was a Dukane Model 92196 with a ¼ inch horn operating at 40 kHz and 20 watts. The silver paste was a silver paste composition 7095 available from E. I. du Pont de Nemours and Company, Wilmington, Del. containing 65.2 wt % silver in the form of fine silver particles and a small amount of glass frit in an organic medium.

The emitter paste was prepared by combining the nanotube suspension/organic medium/silver pastes in the ratios by weight of 27/40/33. The combination was mixed in a three-roll mill for ten passes to form the emitter paste. A pre-fired silvered glass substrate was prepared for each Example by screen printing a mixture of silver powder and a low melting glass frit in a typical organic ethylcellulose-based medium onto glass, followed by firing at 525° C. For Example 13, a 9/16 inch (1.43 cm) square pattern of emitter paste was screen printed onto the pre-fired silvered glass substrates using a 325 mesh screen. For Example 14, an 11×11 pixel array (with pixel diameters of 20 mil size and spaced so that the distance between neighboring pixels was 40 mil. These two samples were subsequently dried at 120° C. for 10 minutes. The samples were then fired in nitrogen for 10 minutes at 525° C. After firing, the nanotube/silver composite forms an adherent coating on the substrate. These fired electron field emitters contained 1.3 wt % of nanotubes in a mostly silver matrix where the weight percentage was calculated on the basis of the total weight of the electron field emitter after firing. The electron field emitter samples were then tested for electron field emission as described previously. Rather than uniform emission from the square pattern of Example 13 or over the whole emitter surface of each pixel of Example 14, only discrete emission sites were observed in the as-fired samples.

Figure 8A:
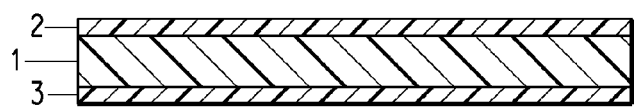
FIG. 8 shows the use of a thermally softened polymer in the process of the invention.

A low melting Riston® polymer film available from E. I du Pont de Nemours and Company was used as the polymer film which was thermally softened and provided the adhesive contact with the electron field emitter. As shown in FIG. 8a, for easy handling the low melting acrylic polymer film 1 of 3 mil thickness was either heat extruded onto a 1 mil thick polyethylene terephthalate (PET) backing 2. A 1 mil polyethylene film 3 with a matted surface texture was used as a cover layer to form a three layer structure.

Figure 8B:
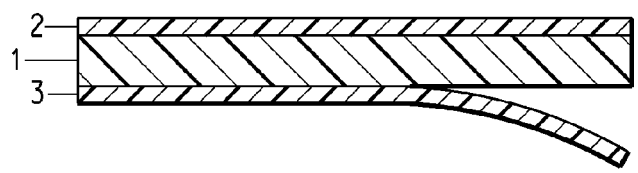
Figure 8C:
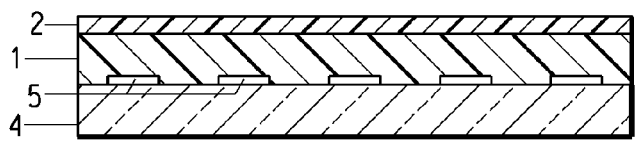
Figure 8D:
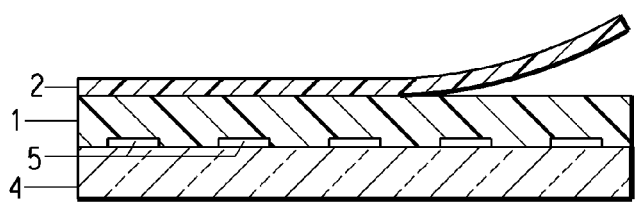
Figure 8E:
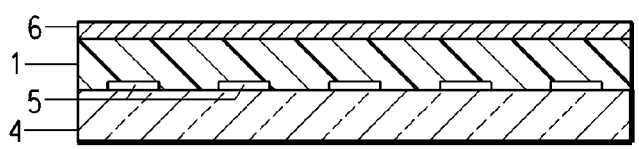
Figure 8F:
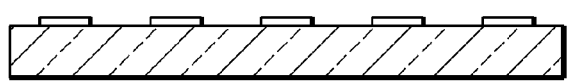

The same procedure was used for Examples 13 and 14. The polyethylene cover layer 3 was first removed exposing the acrylic polymer 1 as shown in FIG. 8b. At room temperature the acrylic polymer was tack free and can be easily placed on the emitter sample surface in preparation for heat lamination. The matted textured polymer surface facilitates air escape during heat lamination. If necessary, a vacuum bag or table can be used to remove all air between the polymer film and sample surface prior to heat lamination thus insuring good contact to surface topography. The polymer film 1 with the PET backing 2 and the sample of Example 14 with the silvered glass substrate 4 and the 11×11 pixel array of electron field emitter 5 were passed through a home/office laminator heated to 60-70° C. with pressure adjusted for bubble free lamination to produce the heat laminated polymer on the emitter as shown in FIG. 8c. Although not carried out in this example, the PET backing 2 should be polymer coated or plasma treated to provide for maximum adhesion to the low melting polymer. For the untreated PET backing used in these Examples, adhesion of the acrylic polymer to the PET was poor thus requiring two additional steps. First the laminated sample was allowed to cool to room temperature and the PET backing 2 was removed as shown in FIG. 8d. Then, a 1 mil thick aluminum foil 6, which adhered well to the acrylic polymer, was heat laminated onto the acrylic polymer 1 as shown in FIG. 8e. These two steps can be eliminated when a coated or treated PET backing is used. Upon cooling to room temperature, the aluminum backed polymer film was peeled off the emitter surface leaving the emitter shown in FIG. 8f. A portion of the electron field emitter of each sample adhered to the acrylic polymer.

The electron field emitters of Examples 13 and 14 were then tested for field emission as previously described except that the spacing used for Example 13 was 1.85 mm. There was a uniform and high density emission across the entire surfaces of the patterned surface of the electron field emitter of Example 13 and of the large square of electron field emitter of Example 14. The current observed for Example 13 with an applied voltage of 2 kV was 6 µA. The current observed for Example 14 with an applied voltage of 3 kV was 80 µA.

Figure 9A:
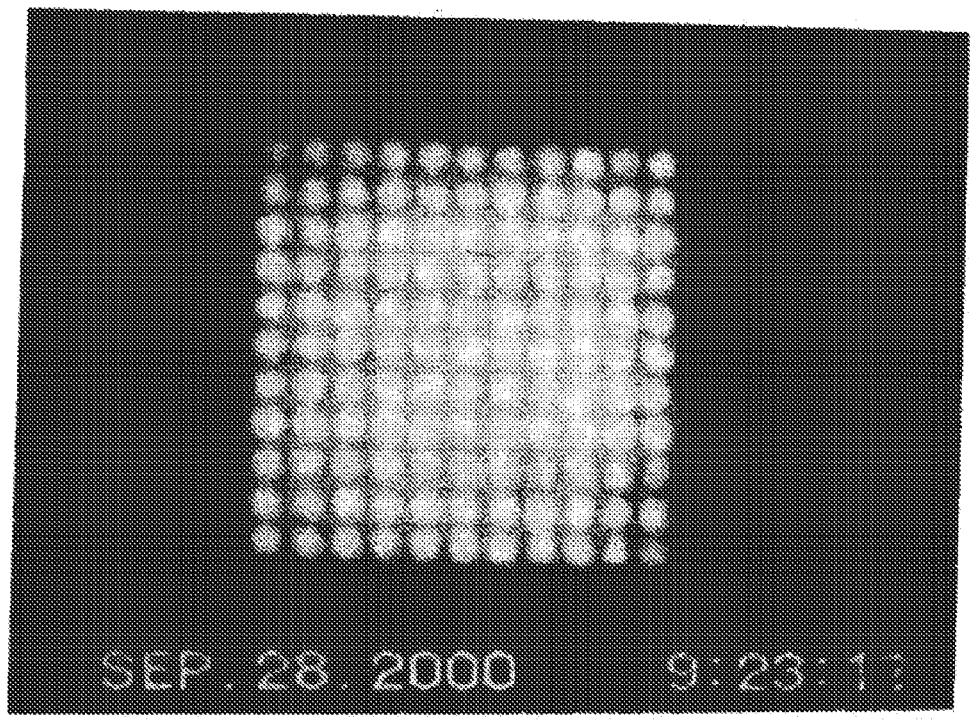
FIG. 9 has photographs of the light emitted from a phosphor layer impinged by electron emission from the electron field emitters of Examples 13 and 14 after undergoing the process of the invention for improving emission.
Figure 9B:
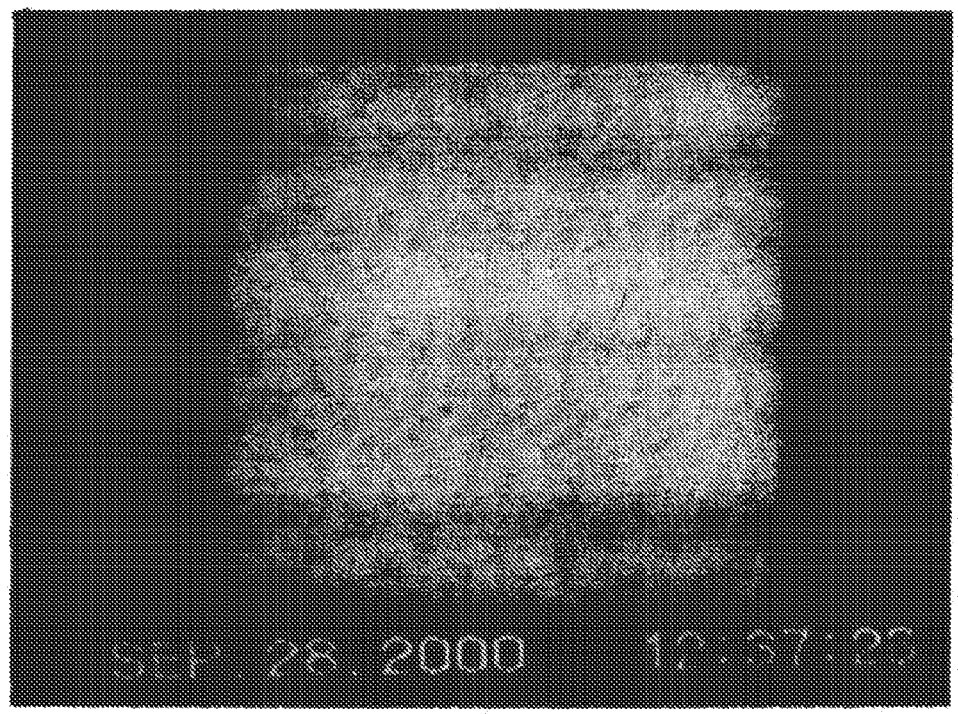

FIG. 9a is a photograph of the light emitted from a phosphor layer impinged by electron emission from the electron field emitter of Example 13 after undergoing the process of the invention for improving emission and FIG. 9b is a photograph of the light emitted from a phosphor layer impinged by electron emission from the electron field emitter of Example 14 after undergoing the process of the invention for improving emission.

Example 15

This Example demonstrates the use of a photoimagable carbon nanotube/silver emitter paste with low concentrations of single wall nanotubes to screen print and photo-image a pattern of electron field emitters and the good emission exhibited by these electron field emitters after undergoing the activation process of the invention for improving emission.

The emitter paste for Example 15 was prepared by mixing two components, one a powder containing single wall carbon nanotubes and the other a photoimagable paste containing silver. Laser ablation grown single wall carbon nanotubes were obtained from Tubes @ Rice, Rice University, Houston, Tex. as an unpurified powder produced by laser ablation. The silver paste composition is DC206 available from E. I. du Pont de Nemours and Company, Wilmington, Del. It contains silver in the form of fine silver particles and a small amount of glass frit in an organic medium containing photoimagable ingredients such as photoinitiator and photomonomers.

The photoimagable emitter paste was prepared by combining the carbon nanotube powder and the Fodel® silver paste in the ratios by weight of 1/100 on a glass plate muller and mixing for 75 rotations. A pre-fired silvered glass substrate was prepared by screen printing a mixture of silver powder and a low melting glass frit in a typical organic ethylcellulose-based medium onto glass, followed by firing at 525° C. A ⅞ inch (2.22 cm) square pattern of photoimagable emitter paste was then screen printed under yellow light onto the pre-fired silvered glass substrate using a 325 mesh screen and the sample was subsequently dried at 120° C. for 10 minutes. The dried sample was then photo-patterned by using a photo tool containing an UV light transparent pattern of "DUPONT". An UV dose of 4000 mJ was used for exposure. The exposed sample was developed in 0.5% carbonate aqueous solution to wash out the unexposed area of the sample. The developed sample was then rinsed thoroughly in water and allowed to dry. The sample was then fired in nitrogen for 10 minutes at 525° C. in nitrogen. After firing, the nanotube/Fodel® silver composite forms an adherent coating on the substrate. This electron field emitter was then tested for electron field emission as described previously. Only discrete emission sites were observed. After the emission test, a piece of Scotch™ Magic™ Tape, (#810-3M Company) was applied to and contacted with the electron field emitter of then removed. A portion of the electron field emitter adhered to the Scotch™ Magic™ Tape. The electron field emitter was then tested for field emission and showed a uniform and high density emission across the entire patterned surface of the electron field emitter.

Figure 10:
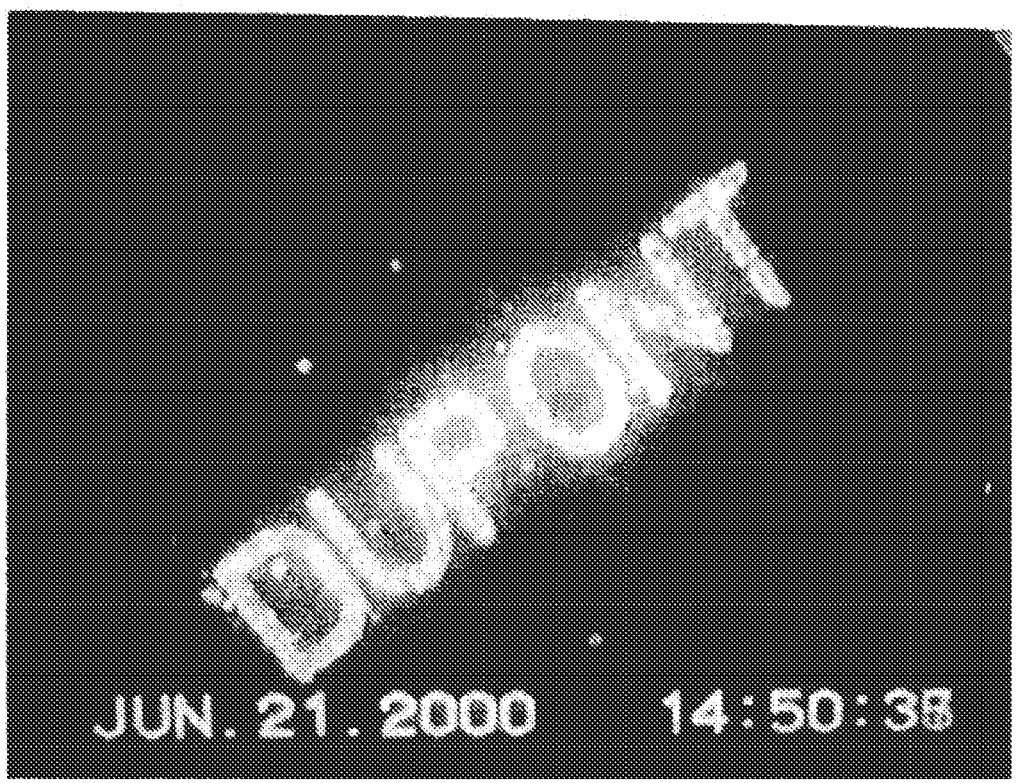
FIG. 10 is a photograph of the light emitted from a phosphor layer impinged by electron emission from the electron field emitter of Example 15 after undergoing the process of the invention for improving emission.

FIG. 10 is a photograph of the light emitted from a phosphor layer impinged by electron emission from the electron field emitter after undergoing the process of the invention for improving emission.

Example 16

This Example demonstrates the use of silver, dielectric, and carbon nanotube/silver emitter pastes in the construction of a fully screen-printed electron field emissive triode array with the carbon nanotube electron field emitter deposited within the vias of the triode structure and the good emission obtained after undergoing the process of the invention for improving emission.

The silver paste was silver paste composition 7095, available from E. I. du Pont de Nemours and Company, Wilmington, Del., containing 65.2 wt % silver in the form of fine silver particles and a small amount of glass frit in an organic medium. The dielectric paste was prepared from a mixture of a low softening bismuth borate frit, alumina filler, ethylcellulose binder, <1% of blue pigment, <1 % of a phosphate surfactant, and terpineol.

Laser ablation grown single wall nanotubes were obtained from Tubes @ Rice, Rice University, Houston, Tex. as an unpurified power produced by laser ablation. The emitter paste was prepared by combining 0.03 grams of nanotube powder with 2.97 grains of 7095 silver paste with a muller to produce the emitter paste with 1.0 wt % nanotubes in the silver paste.

Figure 11A:
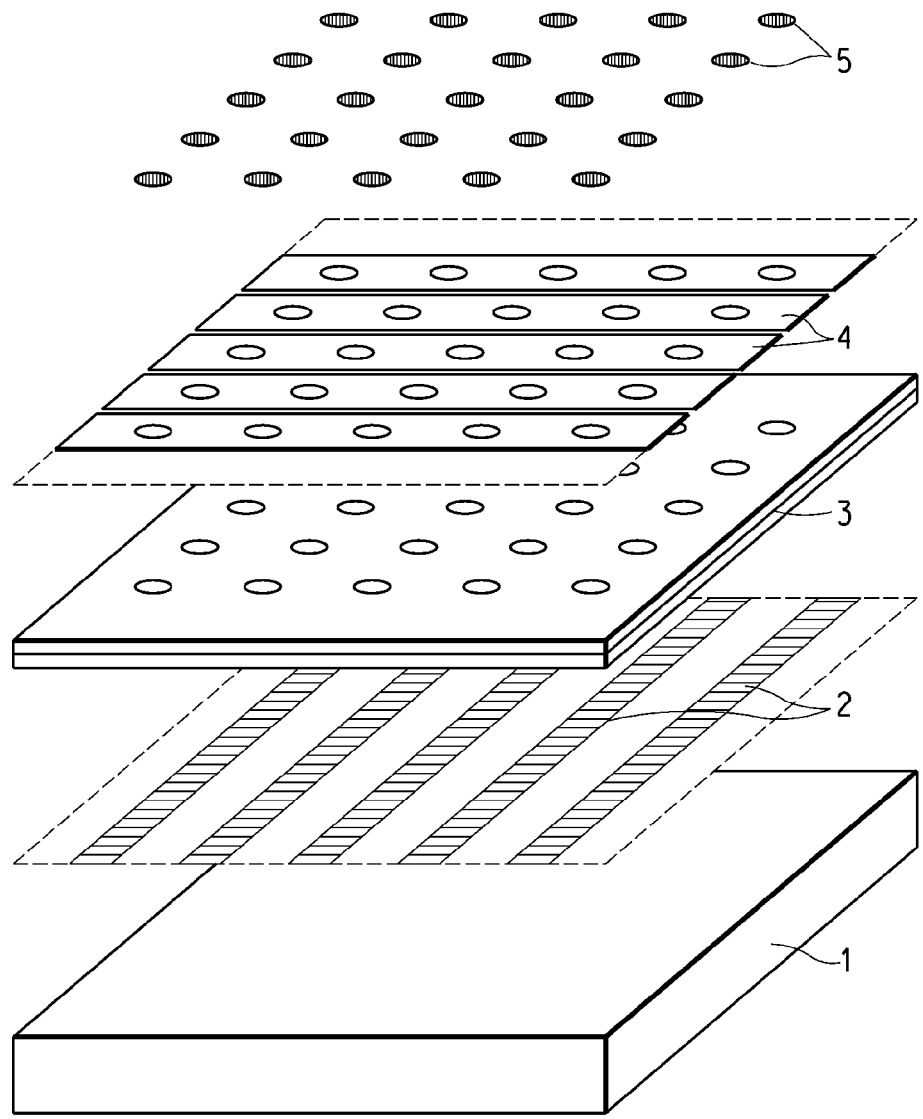
FIG. 11 shows layers forming the fully screen-printed field emissive triode of Example 16 that underwent the process of the invention for improving emission.
Figure 11B:
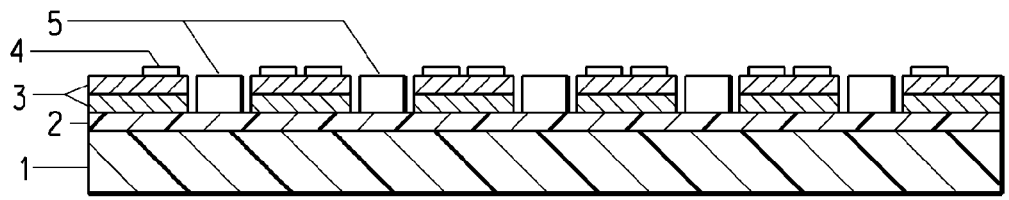

The layers forming the triode are shown in FIG. 11 with the separate layers indicated in FIG. 11a and the finished triode structure shown in FIG. 11b. A silver cathode line pattern 6 µm thick was prepared on a glass substrate 1 by screen printing 7095 silver paste in a five-line pattern 2 using a 325 mesh screen, each line being 30 mils wide, and then firing for ten minutes at 525° C. Two layers of dielectric 3 were then screen printed on top of the cathode lines with a 280 mesh screen containing a 5×5 array of vias, each via having a diameter of 20 mils and being centered on the silver cathode lines. The total thickness of the dielectric was 25 µm. The dielectric was then fired in air at 500° C. A 6 µm single layer of the same 7095 silver paste was then screen printed on top of the dielectric using a 325 mesh screen, in five lines perpendicular to the cathode lines, to function as the gate electrode 4. The gate has vias 28 mil in diameter with centers corresponding to the centers of the vias in the dielectric. The gate layer was then fired in air at 500° C. during which the via diameter was reduced to 25 mils. After firing, the silver layers were 5 µm thick and the dielectric layer was 25 µm thick.

Finally, vias were filled with the emitter paste 5 using a via fill screen with 20 mil holes and then fired to 450° C. in $N_2$ to protect the nanotubes from oxidation. The fired emitter paste plug diameter is 19 mils at the top. The resulting device had a gate-to-via distance of 3 mils.

Figure 12A:
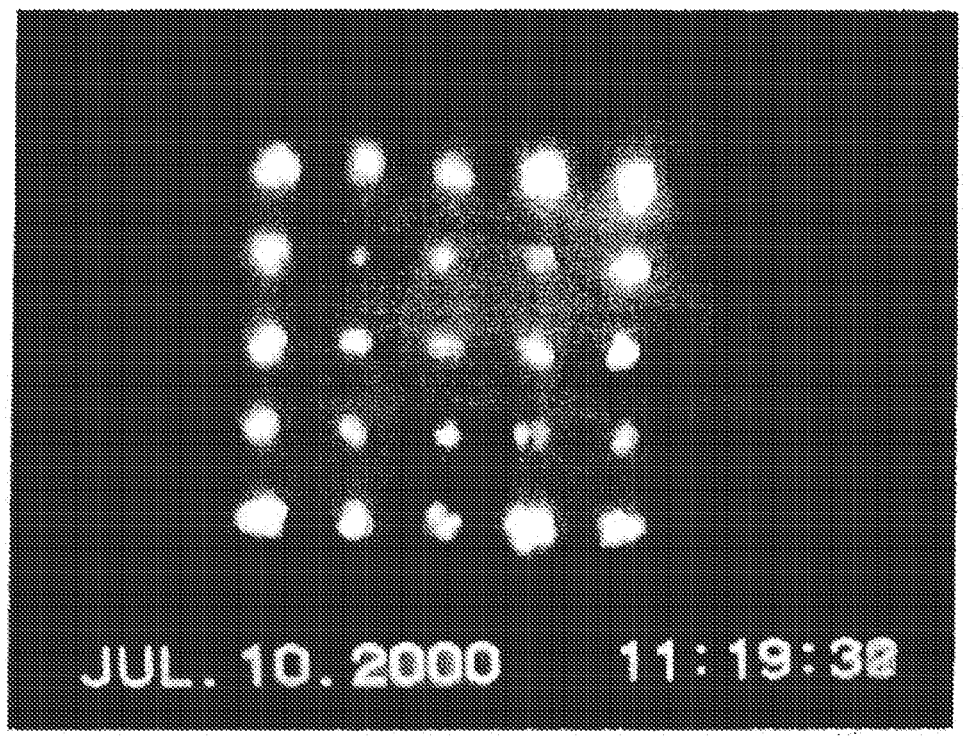
FIG. 12 has photographs of the light emitted from a phosphor layer impinged by electron emission from the screen-printed triode array of Example 16 for both the diode and triode mode.
Figure 12B:
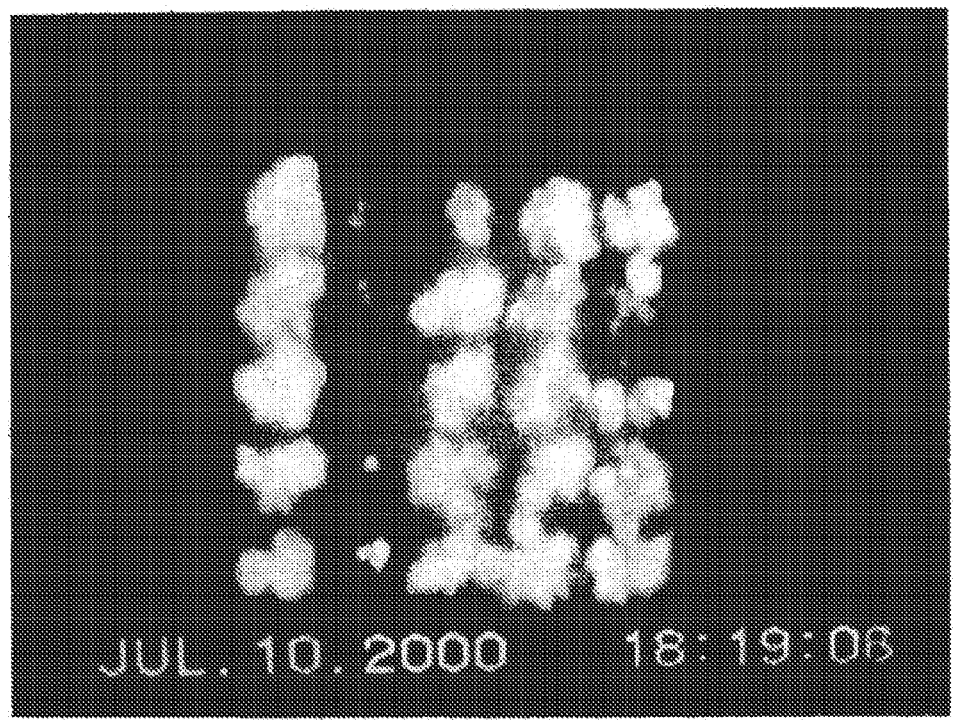

The as-fired triode array was first tested for electron emission in the diode mode as described above. The gate electrode was allowed to float electrically during the diode testing. No emission was observed from the as-fired sample at an anode-cathode voltage of 4 kV. The triode array was then subjected to the process of the invention by contacting the triode surface with a piece of Scotch™ Magic™ Tape, (#810-3M Company). The tape was pressed onto the surface and into the via openings with a soft rubber roller so that the tape would make contact with the electron emitters. Vacuum may be applied to eliminate trapped air inside the via opening to obtain optimal adhesive contact with the emitter. The tape was then peeled off. A portion of the electron field emitter adhered to the Scotch™ Magic™ Tape and could be seen as dark spots on the tape. The triode was again tested for diode emission in the apparatus described previously. The light generated on the phosphor anode during the diode test of the screen-printed triode array is shown in FIG. 12. Emission was observed from all 25 vias as shown in FIG. 12a. An emission current of 130 nA was measured at an anode-cathode voltage of 3.25 kV.

Using the same test apparatus, the triode array was tested in the triode mode by connecting 4 of the 5 gate lines to a pulsed gate power supply, all cathode lines to a DC cathode power supply, and the anode to a DC anode power supply. The one unconnected gate line was left floating electrically, thus providing a control for diode versus triode emission. With the gate power supply set at ground, the anode power supply was set to 3 kV and the cathode power supply to −300V. Weak diode emissions were observed at these voltage settings from the vias associated with the floating gate line, i.e., the 2nd line from the left in FIG. 12b. The gate power supply was then set to produce a pulsed voltage of 100 V at 60 Hz with 3 µsec pulse duration. Strong triode emission was observed for all vias associated with gate lines driven by the gate power supply, i.e., the 1st, 3rd, 4th, and 5th lines from the left in FIG. 12b. A triode emission current of 600 nA was measured at the anode.

Example 17

This Example demonstrates the use of a carbon nanotube/silver emitter paste with low concentrations of single wall nanotubes to screen print electron field emitters for use in a lighting device. Carbon nanotube/silver emitter paste with low concentrations of single wall nanotubes was used to screen print electron field emitters. After undergoing the process of the invention for improving emission, these electron field emitters exhibited strong and uniform emission. Furthermore, the emitters were driven with high anode voltage and to high duty cycles in order to achieve high brightness suitable for lighting applications.

The emitter paste for Example 17 was prepared by mixing single wall carbon nanotube powder into a paste containing silver. Laser ablation grown single wall carbon nanotubes were obtained from Tubes @ Rice, Rice University, Houston, Tex. as a unpurified power produced by laser ablation. The silver paste was silver paste composition 7095 available from E. I. du Pont de Nemours and Company, Wilmington, Del. containing 65.2 wt % silver in the form of fine silver particles and a small amount of glass frit in an organic medium. The emitter paste was prepared by combining 0.03 grams of carbon nanotube powder with 2.97 grams of 7095 silver paste with a muller to give an emitter paste containing 1.0 wt % nanotubes. Pre-fired silvered glass substrates were prepared by screen printing a mixture of 7095 silver paste onto the glass substrate, followed by firing at 525° C. for 10 minutes in a belt furnace. A 9/16 inch (1.43 cm) square pattern of emitter paste was then screen printed onto the pre-fired silvered glass substrate using a 325 mesh screen and the sample was subsequently dried at 120° C. for 10 minutes. The samples were then fired in nitrogen for 10 minutes at 450° C. After firing, the nanotube/silver composite forms an adherent coating on the substrate. The fired electron field emitter contained 1.4 wt % of nanotubes in a mostly silver matrix where the weight percentage was calculated on the basis of the total weight of the carbon nanotube powder and the non-volatile solids of the 7095 paste.

The electron field emitter sample was then tested for electron field emission as described previously. Only discrete emission sites were observed in the as-fired samples. After this first emission test, a piece of Scotch™ Magic™ Tape, (#810-3M Company) was applied to and contacted with the electron field emitter and then removed. A portion of the electron field emitter adhered to the Scotch™ Magic™ Tape. The electron field emitter was then tested for field emission and showed a uniform and high density emission across the entire surface of the electron field emitter.

In order to demonstrate the potential of these electron emitters in lighting related applications, the anode-cathode spacing was increased to 3 mm, which allowed for the use of an anode voltage of 6 kV while maintaining an electric field of 2 V/μm on the emitters. The experiment was carried out by biasing the anode at a constant voltage of 3 kV. Negative 3 kV voltage pulses with 60 Hz repetition rate was applied to the cathode. The pulse duration was allowed to vary from 3 μsec to 3 msec thus spanning a range of 0.018% to 18 % in duty cycle. The emission current density and the phosphor luminance output was found to increase with duty cycle, reaching values of 190 μA/cm$^2$ and 12000 Cd /m$^2$ respectively. This luminance value is twice that of a typical fluorescent lamp. The energy efficiency, which was not optimized, was found to be about 30% that of a fluorescent lamp and 150% that of an incandescent lamp.

Examples 18-22

These Examples demonstrate the emission performance of electron field emitters made with carbon nanotubes obtained from five different sources after undergoing the process of the invention for improving emission.

An emitter paste was prepared for each Example by mixing three components, one a suspension containing carbon nanotubes, one a typical organic medium containing 10% ethylcellulose and 90% beta-terpineol and one a typical paste containing silver. A nanotube suspension was prepared by sonicating a mixture containing about 1% by weight of the nanotubes and 99% by weight of terpineol. The nanotubes used in each Example are:

Example 18—Laser ablation grown single wall nanotubes from Tubes @ Rice, Houston, Tex.

Example 19—Hipco process nanotubes from Carbon Nanotechnologies, Inc., Houston, Tex.

Example 20—Single wall nanotubes from MER Inc., Tuscon, Ariz.

Example 21—Carbolex AP-Grade single wall nanotubes from Carbolex Inc., Lexington, Ky.

Example 22—Multiwall nanotubes from Nanolab Inc., Watertown, Mass. The silver paste was the silver paste composition 7095, available from E. I. du Pont de Nemours and Company, Wilmington, Del., described previously.

The emitter paste was prepared by combining the nanotube suspension/organic medium/silver pastes in the ratios by weight of about 30/40/30 on a three-roll mill for 10 passes. A pre-fired silvered glass substrate was prepared for each Example by screen printing the previously described 7095 silver paste onto glass, followed by firing at 525° C. A 9/16 inch (1.43 cm) square, uniform pattern of emitter paste was then screen printed onto the pre-fired silvered glass substrate using a 325 mesh screen and the samples were subsequently dried at 120° C. for 10 minutes. All the samples were then fired in nitrogen for 10 minutes at 525° C. After firing the nanotube/silver composite forms an adherent coating on the substrate. The fired electron field emitters of the Examples each contain about 1 wt % of nanotubes in a mostly silver matrix where the weight percentages were calculated on the basis of the total weight of the electron field emitter.

A piece of Scotch™ Magic™ Tape, (#810-3M Company) was applied to and contacted with the electron field emitter of each Example and then removed. A portion of each electron field emitter adhered to the Scotch™ Magic™ Tape. The electron field emitter of each Example was then tested for field emission as described previously. Table 1 compares the emission results for the electron field emitters after undergoing the process of the invention for improving emission with emission current density given as a function of applied electric field. It is clear that the nanotubes used in Example 18 exhibit the highest current density of any of those use and are therefore most preferred.

TABLE 1

| Applied Voltage (kV) | Electric Field (V/μm) | Current Density (A/cm$^2$) | | | | |
|---|---|---|---|---|---|---|
| | | Example 18 | Example 19 | Example 20 | Example 21 | Example 22 |
| 0.5 | 0.4 | nm | nm | nm | nm | nm |
| 1.0 | 0.8 | $1.75 \times 10^{-8}$ | $8.5 \times 10^{-10}$ | nm | nm | nm |
| 1.5 | 1.2 | $5.50 \times 10^{-7}$ | $1.50 \times 10^{-8}$ | $4.00 \times 10^{-10}$ | $2.50 \times 10^{-9}$ | nm |
| 2.0 | 1.6 | $5.60 \times 10^{-6}$ | $7.50 \times 10^{-8}$ | $7.50 \times 10^{-9}$ | $4.50 \times 10^{-8}$ | $5.00 \times 10^{-11}$ |
| 2.5 | 2.0 | $1.90 \times 10^{-5}$ | $2.50 \times 10^{-7}$ | $5.50 \times 10^{-8}$ | $2.50 \times 10^{-7}$ | $3.50 \times 10^{-10}$ |
| 3.0 | 2.4 | $4.45 \times 10^{-5}$ | $7.00 \times 10^{-7}$ | $3.00 \times 10^{-7}$ | $1.15 \times 10^{-6}$ | $1.05 \times 10^{-9}$ |
| 3.5 | 2.8 | | $1.45 \times 10^{-6}$ | $9.00 \times 10^{-7}$ | $2.75 \times 10^{-6}$ | $5.00 \times 10^{-9}$ |
| 4.0 | 3.2 | | $3.00 \times 10^{-6}$ | $2.25 \times 10^{-6}$ | $6.50 \times 10^{-6}$ | $1.00 \times 10^{-8}$ | nm = not measurable, i.e., less than $1 \times 10^{-11}$ A/cm$^2$

Example 23

This Example demonstrates the use of oxygen as a reactive gas and gas plasma to dramatically reduce hot spot emission and increase the achievable anode voltage prior to the on-set of uncontrolled emission. It further demonstrates that hot spots can be eliminated without damage to general emission.

The emitter paste for this Example was prepared by mixing three components: one a suspension containing single wall carbon nanotubes, one a typical organic medium containing 10% ethylcellulose and 90% beta-terpineol, and one a typical paste containing silver. Laser ablation grown single wall carbon nanotubes were obtained from Tubes @ Rice, Rice University, Houston, Tex. as an unpurified powder. A nanotube suspension was prepared by sonicating, i.e. by mixing ultrasonically, a mixture containing about 1% by weight of the nanotube powder and 99% by weight of dibutyl carbitol. The ultrasonic mixer used was a Dukane Model 92196 with a ¼ inch horn operating at 40 kHz and 20 watts. The silver paste was the silver paste composition 7095, available from E. I. du Pont de Nemours and Company, Wilmington, Del., described previously.

The emitter paste was prepared by combining the nanotube suspension/organic medium/silver pastes in the ratios by weight of about 30/40/30. The combination was mixed in a three-roll mill for ten passes to form the emitter paste. A pre-fired silvered glass substrate was prepared by screen printing the previously described 7095 silver paste onto glass, followed by firing at 525° C. A 9/16 inch (1.43 cm) square pattern of emitter paste was screen printed onto the pre-fired silvered glass substrates using a 325 mesh screen. The sample was subsequently dried at 120° C. for 10 minutes. The sample was then fired in nitrogen for 10 minutes at 525° C. After firing, the nanotube/silver composite forms an adherent coating on the substrate.

A piece of Scotch™ Magic™ Tape, (#810-3M Company) was applied to and contacted with the electron field emitter and then removed. A portion of the electron field emitter adhered to the Scotch™ Magic™ Tape. The electron field emitter was then tested for field emission.

The sample was then placed in the flat-plate emission measurement unit described previously with an anode to cathode spacing of 1.25 mm. A negative pulsed high voltage power supply was connected to the cathode and thereby to the electron field emitter. The flat-plate emission measurement unit was placed inside a vacuum chamber equipped with argon and oxygen gas inlets and flow controls. The vacuum chamber was evacuated to a pressure equal to or below $1.0 \times 10^{-5}$ torr ($1.3 \times 10^{-3}$ Pa). In order to establish the presence of emission hot spots on the sample, the anode voltage was gradually raised to 1 kV dc. Emission current and luminance of the phosphor screen were observed at an anode voltage as low as 700 V. The hot spot emission current, measured at the anode power supply was found to be 15 µA at 1 kV. More than a thousand strong discrete emission spots were observed in the 2 cm² sample. For a display device operating at 1 kV anode voltage, all hot spots must be eliminated. At a higher anode voltage of 1.3 kV, the number of hot spots and the total current increased to several thousands and 50 µA respectively. While maintaining the hot spot emission at 1.3 kV, argon gas was introduced into the vacuum chamber through a flow control valve to raise the chamber pressure from $1.0 \times 10^{-5}$ torr ($1.3 \times 10^{-3}$ Pa) to $5.5 \times 10^{-4}$ torr ($7.3 \times 10^{-2}$ Pa). This was done to determine the effect of chamber pressure on hot spot emission. No significant effect on the number of hot spots or the total emission current was observed with the chemically inert argon gas. After pumping out the argon gas, oxygen gas was introduced into the chamber to a pressure of $5.5 \times 10^{-4}$ torr ($7.3 \times 10^{-2}$ Pa). Dramatic reductions in the number of hot spots and the total emission current were observed within a few seconds. The visible hot spots on the sample dropped from several thousand to a small number within ten minutes of the introduction of oxygen. Correspondingly, the total emission current dropped from 50 to less than 2 µA. However, the rate of hot spot emission reduction was found to decrease with the emission current and the process appeared to self-terminate. A slight recovery of the hot spot emission was also observed immediately after the oxygen was evacuated from the vacuum chamber. This residual current stabilized at about 7 µA after 20 minutes.

Due to the self-terminating nature and the slight emission recovery, the process for reducing the hot spot emission described in this example should be carried out at an anode voltage higher than the final device anode voltage. No hot spot or emission current was observed when the anode voltage was reduced to 1 kV. Therefore, this example demonstrates the total elimination of over one thousand hot spots observed at 1 kV prior to oxygen quenching of this emission. With the anode held at 1 kV, a negative pulsed voltage of 1.5 kV with pulse duration of 3 µsec and repetition rate of 60 Hz was applied to the cathode. High density and uniform emission was observed with a total emission current measured at 25 µA This demonstrates that no significant damage to the general emission occurred during the oxygen quenching process.

Example 24

The use of photoimagable silver, dielectric, and nanotube/silver emitter pastes in the construction of a thick film based field emissive triode array results in feature size and alignment accuracy superior to those achievable with screen printing alone and the use of the process of the invention for improving emission of such a triode can be achieved as described in this Example.

A normal gate field emission triode has the gate electrode physically between the electron field emitter cathode and the anode. Herein, the gate electrode is considered part of the cathode assembly. The cathode assembly consists of a cathode current feed as a first layer deposited on the surface of a substrate. A dielectric layer, containing circular or slot shaped vias, forms the second layer of the device. An electron field emitter layer is in contact with the cathode conductor within the vias and its thickness may extend from the base to the top of the dielectric layer. A gate electrode layer, deposited on the dielectric but not in contact with the electron field emitters, forms the top layer of the cathode assembly. Critical dimensions in the cathode includes the via diameter, the dielectric thickness, and the gate to electron field emitter distance. All these dimensions must be minimized to achieve optimized low voltage switching of the triode.

The following process will result in the fabrication of a cathode assembly for a normal gate triode array using photoimagable thick films. Various modifications in the steps will be obvious to those skilled in the art. The process for making a cathode assembly with a normal gate triode array using photoimagable thick film pastes comprises:

(a) printing on a substrate a photoimagable silver cathode layer, photo-imaging and developing the silver cathode layer and then firing to produce silver cathode feed lines on the substrate, (b) printing a photoimagable electron field emitter layer on top of the silver cathode feed lines and the exposed substrate, photoimaging and developing the electron field emitter layer into dots, rectangles, or lines on the silver cathode feed lines, (c) printing one or more uniform photoimagable dielectric layers on top of the silver cathode feed lines and the electron field emitters and drying the dielectric, (d) printing a layer of photoimagable silver gate lines on top of the dielectric and drying this layer of silver gate lines, (e) using a photo-mask containing the via or slot pattern to image both the silver gate and the dielectric layers in a single exposure, thereby placing the vias directly on top of the electron field emitter dots, rectangles, or lines, and (f) developing the silver gate and dielectric layers to reveal the electron field emitter layer at the base of the vias and co-firing the electron field emitter, dielectric, and silver gate layers under conditions that are compatible with the electron field emitter.

The cathode assembly containing the triode array is then ready to undergo the process of the invention for improving emission.

In step (b) of the process for making a cathode assembly with a normal gate triode array, the alignment of the subsequent dielectric and gate layers can be simplified if the size of the dots, rectangles, or lines of the electron field emitter layer are significantly larger than the final via dimension. Alternatively, this electron field emitter layer may be fabricated by simple screen printing if this can be accomplished for the desired pitch density of the array and will not require the use of a photoimagable emitter paste. In step(d), if the pitch density is too high for the printing of silver gate lines, a uniform layer of photoimagable silver can be printed and the lines subsequently formed in the imaging step (e) using a mask with a silver gate line and via pattern.

The above process demonstrates how perfect registration of the gate, via, and electron field emitter can be achieved without any critical alignment step when photoimagable thick films are used. Most importantly, this process prevents the formation of shorts between the gate and electron field emitter layers while at the same time achieving minimum gate to emitter separation. This process is applicable to all photo-definable materials in addition to thick films. As an example, a 50 μm diameter via array with 100 μm pitch was fabricated by co-imaging Fodel® silver and dielectric layers. The array was fabricated from 18 μm dried Fodel® DG201-type dielectric with 13 μm of Fodel® silver on top. The array was imaged with 100 mJ, of UV light and developed at 1.5×TTC (standard development) in aqueous alkaline. It was then fired in a 5-zone furnace with about a 10 minute peak temperature of 575° C.

To practice the process of the invention for improving emission on the electron field emitter material in the above described cathode assembly array, a layer of said liquid adhesive is coated on the cathode assembly by screen-printing or some other coating technique well known in the art. The adhesive material is allowed to dry or cure to a solid coating. A pressure or thermal adhesive tape is laminated onto the solid adhesive material. When the relative adhesion between the electron field emitter material, the adhesive coating, and the adhesive tape are properly balanced, peeling of the adhesive tape leads to the removal of the adhesive coating from the cathode assembly and the improved emission of the electron field emitters.

Example 25

The use of photoimagable silver, dielectric, and nanotube/silver emitter pastes in the construction of a thick film based field emissive triode array in an inverted gate triode array in a rib-geometry provides a number of advantages. The design of the described triode array overcomes significant difficulties encountered with electrostatic charging in other inverted or under-gate designs. The fabrication procedure also overcomes difficulties related to feature alignments of the various layers. The use of the process of the invention for improving emission of such a triode can be achieved as described in this Example.

An inverted-gate triode has the electron field emitter cathode physically between the gate electrode and the anode. The cathode assembly consists of gate electrode lines deposited as the first layer on the surface of a substrate. A layer of dielectric ribs, oriented orthogonal to the gate lines, forms the second layer of the device. The dielectric ribs are capped with cathode conductor current feed lines. Forming the top layer of the cathode assembly is an electron field emitter layer deposited on the cathode conductors. The electron emitter layer may be fabricated either as continuous lines or discontinuous segments or dots as required by the display design. Critical dimensions in the device include the rib width, the dielectric thickness, and the edge to edge capping of the dielectric ribs by the electron field emitter layer. It is very important that no electrical contact exist between the cathode conductor and gate layers.

The following process will result in the fabrication a cathode assembly with an inverted gate triode array in a rib-geometry using photoimagable thick films. Various modifications in the steps will be obvious to those skilled in the art. The process for making a cathode assembly with an inverted gate triode array in a rib-geometry using photoimagable thick film pastes comprises:

(a) printing on a substrate a photoimagable silver gate layer, photo-imaging and developing the silver gate layer and then firing to produce silver gate lines on a substrate, wherein each silver gate line width extends well beyond the width of the electron emitters it is to control and the gate line width covers much of the substrate in the vicinity of the electron emitters, (b) printing one or more uniform photoimagable dielectric layers on top of the silver gate lines and the exposed substrate and drying the dielectric, (c) printing a photoimagable silver cathode feed layer on top of the dielectric and drying the silver cathode feed layer, (d) printing a photoimagable electron field emitter layer and drying the electron field emitter layer, (e) using a photo-mask containing a rib pattern to image the electron field emitter, the cathode feed and the dielectric layers in a single exposure thereby achieving perfect alignment of the electron field emitters and the cathode feed lines on top of the dielectric ribs, and (f) developing the electron field emitter, cathode feed, and dielectric layers to produce the rib geometry and co-firing the electron field emitter, cathode feed, and dielectric layers under conditions that are compatible with the electron field emitter.

The cathode assembly containing the inverted triode array is then ready to undergo the process of the invention for improving emission.

For a triode array consisting of electron field emitter dots or segments, in step (d) a photoimagable electron field emitter layer is printed as lines in registration with and parallel to the center of the silver gate lines below. Alternately, a uniform photoimagable electron field emitter layer can be printed to obtain lines of emitters in a finished triode. The electron field emitter layer may also be deposited at a later stage if it is desirable to fire the dielectric and cathode layers in a different atmosphere and at a different temperature than that required for the emitters; in this embodiment another print/dry/image/develop/fire sequence is necessary to fabricate the electron field emitters on top of the cathode feed capped dielectric ribs. This second imaging step does require critical alignment of the photo-mask in registration with the preformed dielectric ribs.

The above process illustrates how perfect registration of the electron emitter, cathode feed, and dielectric features can be achieved without any critical alignment step using photo-imagable thick films. Most importantly, this process prevents short formation between the silver gate and the electron field emitter layers while at the same time minimizing exposed dielectric surfaces around the emitters. The likelihood of electrostatic charging during operation is therefore greatly reduced. In addition, since the electron field emitter layer is located on top the device, the use of an adhesive material to practice the process of the invention for improving emission of the electron field emitter material is straightforward with the inverted gate triode array.

What is claimed:

1. A method for improving the emission current of a field emitter device that comprises an electron field emitter comprising carbon nanotubes on a surface, comprising
   applying a liquid material to the surface;
   heating the liquid material to form a material having adhesive contact with the surface; and
   separating the adhesive material from the surface.

2. The method of claim 1 wherein the liquid material is applied to the surface as a coating.

3. The method of claim 1 wherein the carbon nanotube emitter is screen printed on a substrate for a cathode, and a gate is screen printed on the cathode.

4. The process of claim 1 wherein the carbon nanotubes comprise less than about 9 wt % of the total weight of the electron field emitter.

5. The process of claim 1 wherein the carbon nanotubes comprise about 0.1 wt % to about 2 wt % of the total weight of the electron field emitter.

* * * * *